(12) United States Patent
Emmanuel et al.

(10) Patent No.: US 12,184,934 B2
(45) Date of Patent: Dec. 31, 2024

(54) METHODS AND SYSTEMS TO IMPROVE CONTROL OF CONTENT ITEMS, CHANNELS, ACCOUNTS, SUBSCRIPTIONS, AND RELATED INFORMATION

(71) Applicant: Adeia Guides Inc., San Jose, CA (US)

(72) Inventors: Daina Emmanuel, Karnataka (IN); Jayshil Parekh, Karnataka (IN); Harshavardhan Kalathuru, Andhra Pradesh (IN); Santhiya Krishnamoorthi, Bangalore (IN); Reda Harb, Bellevue, WA (US)

(73) Assignee: ADEIA GUIDES INC., San Jose, CA (US)

( * ) Notice: Subject to any disclaimer, the term of this patent is extended or adjusted under 35 U.S.C. 154(b) by 37 days.

(21) Appl. No.: 17/741,148

(22) Filed: May 10, 2022

(65) Prior Publication Data

US 2023/0370679 A1    Nov. 16, 2023

(51) Int. Cl.
*H04N 21/475* (2011.01)
*H04N 21/45* (2011.01)
*H04N 21/482* (2011.01)

(52) U.S. Cl.
CPC ..... *H04N 21/4532* (2013.01); *H04N 21/4755* (2013.01); *H04N 21/4826* (2013.01)

(58) Field of Classification Search
None
See application file for complete search history.

(56) References Cited

U.S. PATENT DOCUMENTS

| | | | |
|---|---|---|---|
| 8,732,737 | B1 | 5/2014 | Kalmes et al. |
| 8,881,209 | B2 | 11/2014 | Kalmes et al. |
| 9,774,911 | B1 | 9/2017 | Thomas et al. |
| 10,999,632 | B2 | 5/2021 | Hoffman |
| 11,270,342 | B2 | 3/2022 | Campbell et al. |
| 2017/0332119 | A1* | 11/2017 | Casagrande ..... H04N 21/25808 |
| 2018/0352278 | A1* | 12/2018 | Myers ..... G06Q 30/02 |
| 2020/0074321 | A1 | 3/2020 | Chungapalli et al. |
| 2020/0351561 | A1* | 11/2020 | Spencer ..... H04N 21/835 |
| 2020/0380055 | A1 | 12/2020 | Srinivasan et al. |
| 2021/0227297 | A1 | 7/2021 | Hoffman |

* cited by examiner

*Primary Examiner* — Jefferey F Harold
*Assistant Examiner* — Charles N Hicks
(74) *Attorney, Agent, or Firm* — HALEY GUILIANO LLP

(57) ABSTRACT

Methods and systems are provided for improving provider and consumer control of content items, channels, accounts, subscriptions, and related information including metadata. The information regarding the content items, channels, accounts, subscriptions, and related information including metadata is structured into formats suitable for determining past, present, and future user interest in content, likelihood to consume the content, and relatedness of content items. The determinations are used to generate recommendations. Content providers are provided with options to customize conditions of the determinations, the recommendations, and offers based on the same to be provided to consumers. Users are provided with the recommendations and are presented with options to change channel line-ups and subscriptions, including automatic changes based on selected parameters. Related apparatuses, devices, techniques, and articles are also described.

20 Claims, 15 Drawing Sheets

METHODS AND SYSTEMS TO IMPROVE CONTROL OF CONTENT ITEMS, CHANNELS, ACCOUNTS, SUBSCRIPTIONS, AND RELATED INFORMATION

BACKGROUND

The present disclosure relates to content delivery and content consumption and, more particularly, to methods and systems for improving provider and consumer control of content items, channels, accounts, subscriptions, and/or related information including metadata.

SUMMARY

With the increasing popularity of services such as over-the-top (OTT) streaming services, and with the offering of exclusive content from particular streaming services, problems arise for content providers and content subscribers. Providers experience a limit in their ability to convert fans of their programming (e.g., past and potential subscribers) into active subscribers, to effectively present past and potential subscribers with information regarding high interest content, and to minimize potential lost revenue. Subscribers generally struggle with what to watch and to what service to subscribe to. Subscribers are also inundated with choices, not always aware of future content of high interest, and uncertain how best to make selections.

Conventional approaches frustrate subscribers to the point of dropping subscriptions prematurely or refusing to renew. Current subscribers to a stream for content of high interest later become frustrated if they learn they have paid for a service they do not use regularly. Still other potential subscribers learn of content of high interest after a premiere and miss the thrill of the premiere, or worse, have the high interest content spoiled (e.g., a plot twist or final score) by learning about the high interest content via social media, mass media, or conversations with friends and family. Moreover, conventional approaches are not specifically geared to these problems. As a result, with conventional approaches, subscribers lose confidence and interest in subscriptions, learn of high interest content after-the-fact, and/or miss content entirely, and providers lose revenue.

According to an existing approach, service providers allow subscribers to select packages of content—one package might include a set of basic channels, while another might include premium channels for an additional fee. Users consume content from various channels—for example, a user might currently be watching the "Animal Kingdom" on TNT, and the show "Godfather of Harlem" on Epix. Some current systems allow users to personalize their channel line-up by "exchanging" certain channels that they are subscribed to with other channels—basically swapping out channels. This model is very popular, for instance, in Canada. However, such feature is inefficient and time consuming since it is a self-service feature, does not recommend to the user what channels to swap, and is not associated or driven by analytics. A subscriber might end up missing their favorite content because they are not aware of what some channels (not part of their line-up) are offering at any given time.

To overcome these and other problems, methods and systems are provided for content delivery and content consumption. The methods and systems improve provider and consumer control of content items, channels, accounts, subscriptions, and/or related information including metadata. In some embodiments, the related information is structured into improved data structures configured to achieve the improved control.

Data and information regarding the content items, channels, accounts, subscriptions, and related information including metadata are structured into one or more formats. The formats may be configured for subsequent processing and determinations. Past, present, and/or future user interest in content, likelihood to consume the content, relatedness of content items, and the like are determined. One or more of the determinations, either alone or with the inputted raw data and information including metadata may be used to generate one or more recommendations. The recommendations may involve content, one or more channels and/or one or more subscriptions. In some embodiments, the recommended content, channels, and/or subscriptions involve new (including live and rebroadcast) content with a future availability date. Content providers are provided with options to customize conditions of the determinations, the recommendations based on the determinations, and offers based on the same to be provided to users. Users are provided with the recommendations and are presented with options to, for example, change channel line-ups and subscriptions. Users may elect to automatically change the channel line-ups and subscriptions based on selected parameters. Related apparatuses, devices, techniques, and articles are also described.

In some embodiments, a user profile and/or a subscription profile are accessed. An interest in a content item is determined based on the user profile and/or the subscription profile. In response to the determined interest satisfying a condition, access to the content item is determined to be included in the subscription profile. The method includes, in response to determining that access to the content item is not included in the subscription profile, modifying the subscription profile to include access to the content item. In some embodiments, detailed below, recommendations are generated. The recommendations may utilize an improved catalog of one or more content items for achieving improved control.

In some embodiments, the method includes, in response to determining that access to the content item is not included in the subscription profile, generating a recommendation and a user selectable option for accepting the recommendation.

In some embodiments, the method includes determining that the subscription profile includes access to a channel including a series of content items. The method includes determining that an entirety of the series was viewed. The method includes automatically modifying the subscription profile to delete access to the channel including the viewed series while automatically modifying the subscription profile to include the access to the content item.

In some embodiments, the method includes generating for a service provider one or more selectable options for modifying one or more of the user profile, the subscription profile, and the content item profile.

In some embodiments, the method includes generating for a central service one or more selectable options for modifying one or more of the user profile, the subscription profile, and the content item profile.

In some embodiments, the method includes generating for a user a selectable option to grant or deny access to the subscription profile via an application programming interface (API).

In some embodiments, the method includes receiving account subscription data from a service provider.

In some embodiments, the method includes determining one or more of: previously viewed content items, a frequency of viewing the one or more previously viewed content items, whether a new episode of a new content item is viewed in one or more of a live viewing state, an on-demand viewing state, in a recorded state, and in a binge pattern state.

In some embodiments, the method includes predicting an impact on a viewing experience of one or more users in response to the modifying the subscription profile to include access to the content item.

In some embodiments, the method includes storing an identification of a first pause point of a media asset associated with a first user interaction profile. The method includes storing an identification of a second pause point of the media asset associated with a second user interaction profile. The method includes receiving a request to access the media asset during a current consumption session. The method includes identifying user interface inputs received during the current consumption session. The method includes selecting one of the first pause point and the second pause point as a selected pause point based on determining whether the identified user interface inputs match user interface inputs associated with the first user interaction profile or the second user interaction profile. The method includes generating for presentation the media asset starting from the selected pause point.

In some embodiments, the method includes determining that a plurality of user profiles is associated with an account of a media application. The method includes generating for presentation a media asset during a first consumption session associated with the account. The method includes generating for presentation a selectable option to associate a current progress point of the media asset with one or more of the plurality of user profiles associated with the account. The method includes receiving a selection of one or more of the plurality of user profiles via the selectable option. The method includes, during a second consumption session, receiving a request for accessing the media asset. The method includes, in response to determining that the second consumption session is associated with the selected one or more user profiles, resuming the media asset from the progress point associated with the selectable option.

In some embodiments, the method includes determining, for each user profile of a plurality of user profiles, one or more of a scrolling rate, selection of one or more trick play functions, a watching pattern, selection of a command to skip a commercial, and a preference for a type of content.

In some embodiments, the method includes determining in the subscription profile an eligibility for a channel to be exchanged for another channel.

In some embodiments, the method includes determining whether one or more content items are available now and/or will be available over a given time period.

In some embodiments, the method includes generating metadata about upcoming shows and/or content from advertisements.

In some embodiments, the method includes automatically scheduling of a recording on a timeshift channel.

In some embodiments, the method includes generating an offering profile for one or more content items, the offering profile including a data structure associated with the one or more content items.

In some embodiments, the data structure includes information indicating whether the one or more content items are scheduled to be re-aired, a frequency of the one or more content items scheduled to be re-aired, whether the one or more content items are available on-demand, and a duration in time for the one or more content items to be available on-demand.

In some embodiments, the method includes generating a notification for display on an electronic programming guide (EPG) including one or more new channels added to the subscription profile.

In some embodiments, the method includes generating one or more selectable options to modify the subscription profile based on a recommendation determined in response to the determined interest satisfying a condition.

In some embodiments, the method includes generating for display a comparison table summarizing a viewing activity and one or more content items that are accessible in response to acceptance of the recommendation.

In some embodiments, the method includes prioritizing one or more content items based on one or more of content availability, the determined interest in the one or more content items, a determination of a rate of consumption of previously viewed one or more content items, and a determination of whether one or more content items will re-air.

In some embodiments, the method includes determining whether the access is available free or available for a fee.

In some embodiments, the method includes accessing a catalog of one or more content items. The catalog includes, for each of one or more content providers, and for each content item, a content index based on one or more content attributes of the content item. The method includes accessing a user map of one or more users. The map includes, for each of one or more time periods, and for each user, a user index based on a determined user interest in the one or more of the content attributes; and determining a subscription recommendation for each user based on one or more of the catalog, the content index, the user map, and the user index.

In some embodiments, the one or more content attributes include: a title, a genre, a microgenre, an actor, an age, an expiration date, an n-th language, an (n+1)-th language, a running time, a time slot, a date of production, a rating, a user-defined content attribute, and a customized content attribute. The content index includes a weight for each of the one or more of the content attributes.

In some embodiments, the determined user interest includes a determined past user interest in the one or more of the content attributes, a determined current user interest in the one or more of the content attributes, and a determined predicted future user interest in the one or more of the content attributes. The user index includes a weight for each of the one or more of the content attributes.

In some embodiments, the determined user interest is based on a determination by one or more of a machine learning technique, a predictive model, a model training technique, data selection, data sourcing, data synthesis, an analytical technique, a regression analysis, a classification analysis, a neural network, data engineering, data modeling, operationalization using registration, a deployment, monitoring, and a retraining technique.

In some embodiments, the catalog is mapped to the user map using the content index of each content item and the user index of each user.

In some embodiments, the determining of the subscription recommendation for each user includes one or more of: a subscription recommendation for a past subscriber, a subscription recommendation for a current subscriber, and a subscription recommendation for a potential subscriber. The determining of the subscription recommendation for each user is further based on one or more of: past information based on formerly available content from the one or more content providers, current information based on currently available content from the one or more content providers, and future information based on upcoming content from the one or more content providers.

In some embodiments, the method includes analyzing one or more of: one or more media devices accessing a streaming service, a user profile of the user linked to the one or more media devices connected to the streaming service, and the content item or content items sent to and/or received from the one or more media devices. The method includes controlling the subscription based on the analyzing. The method includes controlling the one or more content items based on the analyzing.

In some embodiments, the method includes determining an optimized schedule for the subscription recommendation. The method includes determining a cost allocation for the optimized schedule. The method includes generating a user interface for controlling the subscription based on the optimized schedule and the cost allocation.

The method includes transmitting an offer to the user based on the determined subscription recommendation. The offer is mapped to the subscription. The content provider is provided with one or more selectable options for changing one or more conditions of the subscription. The offer is based on the one or more options for changing the one or more conditions selected by the content provider.

The method includes, in response to a determination that one or more changes of the subscription is likely to increase or decrease a predicted behavior occurring, offering a modified subscription based on the one or more changes. The predicted behavior is one or more of: a predicted likelihood of viewing the content item, a predicted likelihood to purchase the subscription, a predicted likelihood to renew the subscription, and a predicted likelihood to cancel the subscription. The one or more changes include one or more of: changing a price of the subscription, changing a duration of the subscription, and changing content accessible via the subscription.

A system is provided comprising control circuitry configured to perform one, more, or all of the features described above.

A non-transitory computer-readable medium having non-transitory computer-readable instructions encoded thereon is provided that, when executed by control circuitry, cause the control circuitry to perform one, more, or all of the features described above.

A device is provided including means for performing one, more, or all of the features described above.

Any of the features of the methods and systems above may be obtained with a trained model. The model may be trained with the catalog and/or the user map. The content index, the user index, and the subscription recommendation may be determined by a trained model.

Notably, the present disclosure is not limited to the combination of the elements as listed herein and is assembled in any combination of the elements as described herein. These and other capabilities of the disclosed subject matter will be more fully understood after a review of the following figures, detailed description, and claims.

BRIEF DESCRIPTIONS OF THE DRAWINGS

The present disclosure, in accordance with one or more various embodiments, is described in detail with reference to the following figures. The drawings are provided for purposes of illustration only and merely depict embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The embodiments herein are better understood by referring to the following description in conjunction with the accompanying drawings, in which like reference numerals indicate identically or functionally similar elements, and in which.

Figure 1A:
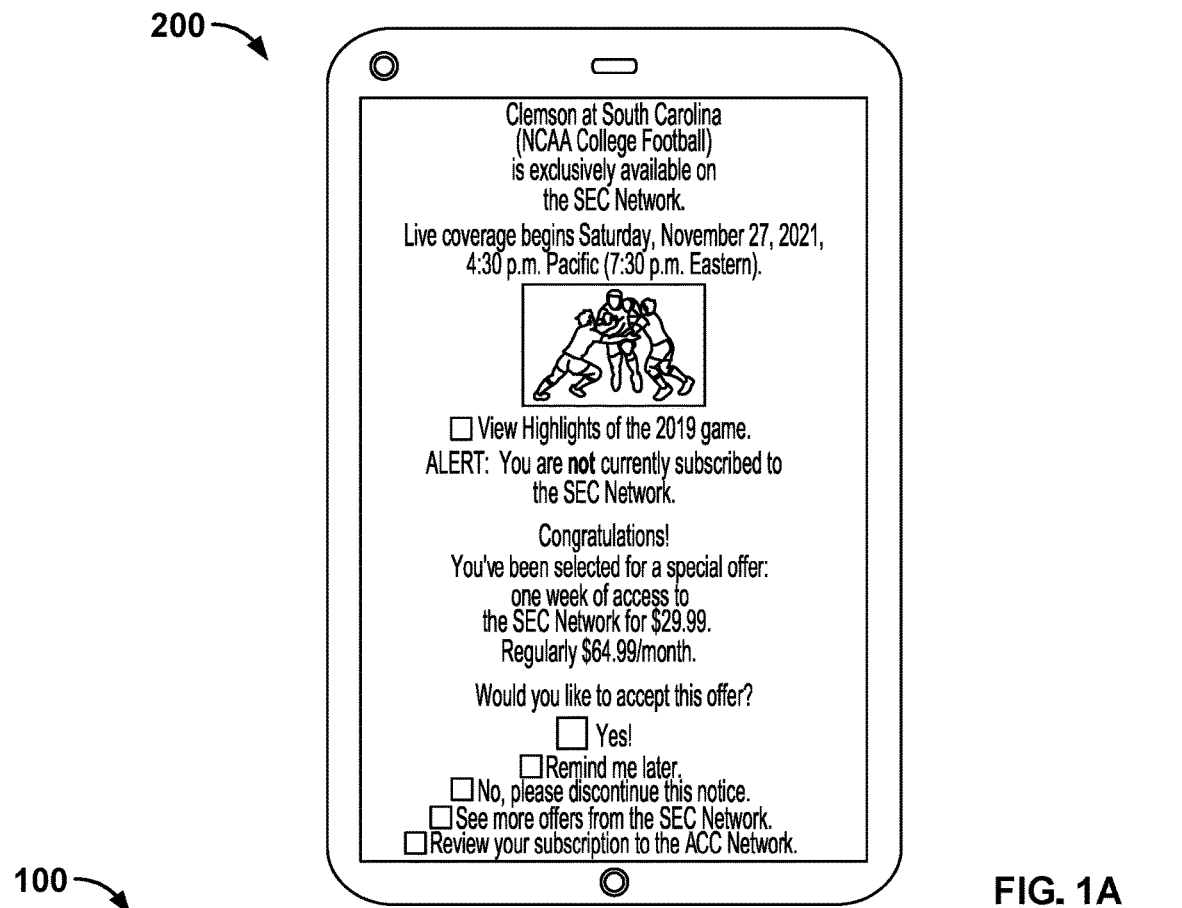
FIG. 1A depicts a tablet displaying a user interface (UI) according to an exemplary embodiment.

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting embodiments.

DETAILED DESCRIPTION

Improved methods and systems are provided to convert past subscribers and potential subscribers to active subscribers, to incentivize the active subscribers to renew, to present the past subscribers, the potential subscribers, and the active subscribers with information regarding high interest content, and to decrease potential lost revenue to content providers. The methods and systems provide content providers with tools to achieve these improvements. The methods and systems provide subscribers with information of future content of high interest and tools to add and delete subscriptions to better suit needs and budgets.

In some embodiments, subscriptions are added adding a further layer of security for a "superfan" of high interest content. In some embodiments, subscriptions are deleted adding a further layer of security for a "super miser" who is interested in certain content but would become frustrated and is likely to lose interest in a subscription if they later experience buyer's remorse. Content providers are provided in some embodiments with improved tools to dial up and dial down levels of engagement with current and potential subscribers based on improved user profiles. In some embodiments, content providers are provided options to dial up and dial down engagement levels in response to specific detected behavior on the part of the current or potential subscriber.

Content Catalog Index

A catalog of content from provider A, provider B, provider C, etc., is provided as input. The catalogs are analyzed, and one or more index values are determined. The index value corresponds with, for example, different genres, microgenres, and the like. For example, in one embodiment, the index value is determined per genre and/or per microgenre per content provider. The index value is determined for one or more content attributes including a title, a genre, a microgenre, an actor, an age, an expiration date, an n-th language, an (n+1)-th language, a running time, a time slot, a date of production, a rating, a user-defined content attribute, a customized content attribute, and the like. In some embodiments, age of content is used to sort content from oldest to latest (relatively recent) with the latest content given more weight. In some embodiments, collections of content are provided with separate indexes mapping a genre and/or microgenre to a user.

For example, prior to Family Man, Season 2, being released in June 2021, a relatively high index value for Amazon Prime Video is determined for a user whose primary language is Hindi, and whose metadata indicates that action is a favorite genre. Prior to the premiere of Season 3 in 2022, the same user is targeted for advertising relating to the premiere and, if they are not currently a subscriber, the potential user is offered a subscription to the streaming service.

Table 1 is an example of a content index, in which, for each genre and/or microgenre, and for each content provider, an index value or index formula is determined for each provider. Table 1 could continue for additional Providers D . . . n. Ellipsis denotes similar data in subsequent fields.

TABLE 1

Exemplary Content Index

| Genre/Category # | Microgenre/ Subcategory #.# | Provider A | Provider B | Provider C |
|---|---|---|---|---|
| Sports 1 | Cricket 1.1 | 8G1.1+5A+9E | 7G1.1+1A+2E | <weight1><Genre>.<Microgenre>+ <weight2><Aging Content>+ <weight3><Key Content> |
| | Basketball 1.2 | 3G1.2+5A+9E | ... | ... |
| | Football 1.3 | 9G1.3+5A+9E | ... | ... |
| | Highlights 1.4 | ... | ... | ... |
| | ... | ... | ... | ... |
| Language 2 | Korean 2.1 | 8G1.1+5A+9E+1L2.1 | ... | <weight1><Genre>.<Microgenre>+ <weight2><Aging Content>+ <weight3><Key Content>+ <weight4><Language>.<Subcategory> |
| | English 2.2 | ... | ... | ... |
| | Spanish 2.3 | ... | ... | ... |
| | ... | ... | | |
| Comedy 3 | ... | | | |
| Action 4 | ... | | | |
| Thriller 5 | ... | | | |
| RomCom 6 | ... | | | |
| ... | | | | |

User Profile Index

The methods and systems are configured to determine a user profile based on modeling techniques to generate a user map. In some embodiments, the user profile is learned and continuously modified. With time, the user profile changes and correspondingly an order of preference for a provider changes. For example, at a start time period t1, a user watches a Korean series and continues it for time period t2, t3, . . . tn. Changes over time are provided on a provider list. Table 2 could continue for additional time periods t3 . . . tn. Ellipsis denotes similar data in subsequent fields.

TABLE 2

Exemplary User Index

| User: Index | Time Period t1 | Time Period t2 |
|---|---|---|
| User A: G1.1+G2+G4+9A | Provider A: (8G1.1+5A+9E+(1L2.1+9L2.2)) Provider B: (8G1.1+5A+9E)+(9G1.5+2A+2E) Provider C: ... | Provider E: ... Provider B: ... Provider D: ... ... |
| User B: ... | Provider A: ... Provider B: ... Provider C: ... ... | Provider C: ... Provider B: ... Provider F: ... ... |
| ... | ... | ... |

Example 1: The Lowry Family, Clemson Tigers Superfans

College football fans are often unsure of exactly what game will be shown on what network and even the kickoff time until, in some cases, the week of the game. Specifically, although the dates, opponents, and locations for the games are set well in advance (see, e.g., Table 4 below for an exemplary pre-season 2022 college football schedule), specific kickoff times are often announced only a few days before the event (e.g., each Tuesday following the release of updated major college football rankings like the AP Top 25 and Coaches' Poll). Since content providers are keen to cover the highest ranked matchups on their platforms, it is often the case that relatively large network broadcasters (e.g., ABC, NBC, etc.) pick up the "big" games between highly ranked teams. Cable broadcasters such as ESPN cover a large chunk of college football games that are not broadcast by the large broadcasters or in certain markets, and, particularly in the last few years, over-the-top (OTT) streaming platforms (e.g., ACC Network, SEC Network, in some cases accessible via fuboTV, DIRECTV STREAM, Sling TV, AT&T TV, Hulu Live TV, YouTube TV, etc.) have increasingly picked up games not broadcast by national broadcast or cable networks and/or in markets where games are not widely available. These games may not be of broad interest nationally but may be of keen interest to superfans who like to see every game regardless of ranking or championship implications.

The Lowrys, all alumni of Clemson University, are superfans of the Clemson Tigers football team. Three generations of the Lowrys 107 enjoy watching games as a family (e.g., FIG. 1A) in their living room 100. By the end of the 2021 season, in the Lowrys' market (California) (see, e.g., Table 3 below), only two games were widely available on ABC, and six games were on the cable network ESPN. Five games were available only on subscription-based OTT streaming services, i.e., four on the ACC Network, and one on the SEC Network. Clemson was highly rated early in the season but had setbacks that temporarily dropped the Tigers out of the Top 25 of the national rankings and landed them in a relatively early bowl game against an unranked opponent. Thus, two early games (i.e., Georgia and Georgia Tech) were nationally televised, but many subsequent games were not picked up by national networks or ESPN and, in some markets, only available on streaming networks like the ACC Network. As a result, without the present methods and systems, the Lowrys needed to manually monitor media to determine coverage. Sometimes, if the listings were not checked on or after Tuesday (after the AP rankings came out), the Lowrys would wake up Saturday morning, and experience a letdown learning that the Tigers were not broadcast in their market. They would then scramble to determine whether and how to find the Tigers game.

For superfans such as the Lowrys, who want to see all the games regardless of the team's record, with conventional approaches, a viewer has to monitor the kickoff schedule each week and sign up for and/or cancel subscriptions or miss seeing the game. Games of lesser national importance have little or no widely broadcast commercial advertising.

From the content provider standpoint, the audience for a given game on the SEC Network might normally be marketed primarily to SEC fans in regions associated with the matched teams, but some games would be of interest to fans of an opposing team in another conference, such as the ACC. Other fans may live in a region not normally associated with viewership. The Clemson-South Carolina rivalry game did not have national championship implications but was of wide interest to fans of both teams, South Carolinians in general, and the Lowrys in particular.

The week of the Clemson-South Carolina game, with Clemson back in the AP Top 25, the Lowrys were confident the game would be picked up, but it was only available in their market on the SEC Network streaming service. The Lowrys were left with a choice to order a last minute subscription to the SEC Network, go to a sports bar with a satellite TV package, or miss seeing the game live entirely.

TABLE 3

2021 Clemson Football Schedule as of December 2021

| OPPONENT | DATE | TIME (ET) | TV | LOCATION |
|---|---|---|---|---|
| vs. Georgia | Sat., Sept. 4 | 7:30 p.m. | ABC | Charlotte, NC |
| vs. South Carolina State | Sat., Sept. 11 | 5 p.m. | ACC Network | Clemson, SC |
| vs. Georgia Tech | Sat., Sept. 18 | 3:30 p.m. | ABC | Clemson, SC |
| at NC State | Sat., Sept. 25 | 3:30 p.m. | ESPN | Raleigh, NC |
| vs. Boston College | Sat., Oct. 2 | 7:30 p.m. | ACC Network | Clemson, SC |
| BYE | | | | |

TABLE 3-continued

2021 Clemson Football Schedule as of December 2021

| OPPONENT | DATE | TIME (ET) | TV | LOCATION |
| --- | --- | --- | --- | --- |
| at Syracuse | Fri., Oct. 15 | 7 p.m. | ESPN | Syracuse, NY |
| at Pittsburgh | Sat., Oct. 23 | 3:30 p.m. | ESPN | Pittsburgh, PA |
| vs. Florida State | Sat., Oct. 30 | 3:30 p.m. | ESPN | Clemson, SC |
| at Louisville | Sat., Nov. 6 | 7:30 p.m. | ACC Network | Louisville, KY |
| vs. UConn | Sat., Nov. 13 | 12:00 p.m. | ACC Network | Clemson, SC |
| vs. Wake Forest | Sat., Nov. 20 | 12:00 p.m. | ESPN | Clemson, SC |
| at South Carolina | Sat., Nov. 27 | 7:30 p.m. | SEC Network | Columbia, SC |
| ACC Championship (DNQ) | Sat., Dec. 4 | 8:00 p.m. | ABC | Charlotte, NC |
| vs. Iowa State (Cheez-It Bowl) | Wed., Dec. 29 | 5:45 p.m. | ESPN | Orlando, FL |

For example, on Tuesday, Nov. 23, 2021, the Lowrys are watching The Voice on NBC. With the present methods and systems, useful information is transmitted to a device 200 regarding future content of interest. The device 200 may be a television, such as HDTV 101 in FIG. 1B, smartphone, tablet, such as tablet 200 in FIGS. 1A, 1B, and 2, or any other suitable device. The HDTV 101 may be configured to display an alert 103, which may be similar and/or include some or all of the information presented in detail in FIG. 2. The information may be included in a content programming guide, an on-screen message, a graphical user interface, an email, a text message, and the like.

The system accesses metadata including the Lowrys past and current viewing habits, determines multiple devices of the Lowry household were tuned to programming including the "Clemson" and "college football" metatags throughout the 2021 season, that the tagged content items were consumed live or within an hour of the live broadcast, and that there is a high likelihood (e.g., greater than a 50% threshold set by the content provider) the Lowrys will be interested in the upcoming Clemson at South Carolina game. The system further accesses programming information associated with the Lowrys' account and determines that the Clemson at South Carolina game will only be available in the Lowrys' market on the SEC Network.

television package, and which, if any, of the streaming networks they should subscribe to. If Clemson has a great season, like 2016 and 2019, they will likely be on national broadcast and cable networks all year long. But, if Clemson's season is anything like last year, they may be turning to streaming services for coverage. Regardless of Clemson's record, games against opponents like Furman and Louisiana Tech are unlikely to be picked up by the national broadcasters and cable networks, especially in California.

With the present methods and systems, information and tools are provided to a user via a user device. The information and tools allow the Lowrys to make decisions in advance and with sufficient notice to make necessary adjustments to their channel line-up and subscription options. Also, the method and system equip content providers with tools for attracting subscribers that might otherwise be missed and provide information and tools to potential subscribers that would attract them to content they might not be aware of and/or that can only be accessed via subscription.

After an announcement of a kickoff time and network for a particular game, with the present methods and systems, the managers of, for example, the ACC and SEC Networks are presented with selectable options for targeting potential subscribers, namely, ACC fans interested in seeing a matchup with an SEC team covered by the SEC Network, or

TABLE 4

2022 Clemson Football Schedule as of April 2022

| OPPONENT | DATE | TIME (ET) | TV | LOCATION |
| --- | --- | --- | --- | --- |
| at Georgia Tech | Mon., Sept. 5 | TBD | TBD | Atlanta, GA |
| vs. Furman | Sat., Sept. 10 | TBD | TBD | Clemson, SC |
| vs. Louisiana Tech | Sat., Sept. 17 | TBD | TBD | Clemson, SC |
| at Wake Forest | Sat., Sept. 24 | TBD | TBD | Winston-Salem, NC |
| vs. NC State | Sat., Oct. 1 | TBD | TBD | Clemson, SC |
| at Boston College | Sat., Oct. 8 | TBD | TBD | Chestnut Hill, MA |
| at Florida State | Sat., Oct. 15 | TBD | TBD | Tallahassee, FL |
| vs. Syracuse | Sat., Oct. 22 | TBD | TBD | Clemson, SC |
| BYE | | | | |
| at Notre Dame | Sat., Nov. 5 | TBD | TBD | Notre Dame, IN |
| vs. Louisville | Sat., Nov. 12 | TBD | TBD | Clemson, SC |
| vs. Miami | Sat., Nov. 19 | TBD | TBD | Clemson, SC |
| vs. South Carolina | Sat., Nov. 26 | TBD | TBD | Clemson, SC |
| ACC Championship (TBD) | Sat., Dec. 3 | TBD | TBD | Charlotte, NC |
| Bowl Game(s) | TBD, December/January | TBD | TBD | TBD |

Now, it is April 2022. The 2022 football schedule has been announced (see, Table 4), but only opponents, dates, and locations are set. Some games like the ACC Championship depend on regular season play, and the Bowl Games are decided after the conference championships. The Lowrys are unsure which channels to include in their cable television package, and which, if any, of the streaming ACC fans without local coverage of their alma mater. Such potential subscribers might not be interested in a season subscription but are often willing to purchase a single-game pass, perhaps at a premium due to the exclusivity of the game. Prior to the game, a potential subscriber might not have been aware that a given game would only be available in their market on a given channel or streaming service, and the methods and systems are configured to deliver information to the potential subscriber alerting them of the game and offering a single-game pass to the appropriate channel and/or subscription service. As a result, the channel and/or subscription service generates revenue it might not have otherwise collected. The potential subscriber is given a reasonably priced short-term subscription option, the fan does not miss seeing a game of particular importance to the viewer, and the overall viewing experience is improved.

Figure 1B:
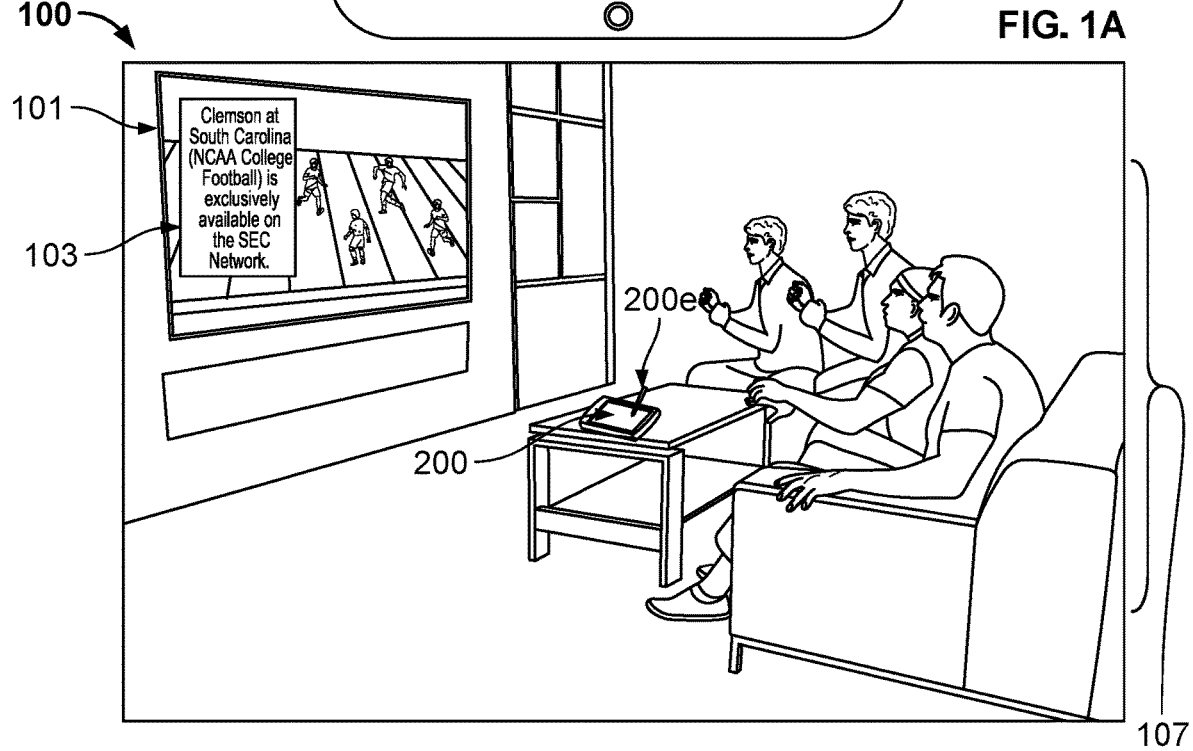
FIG. 1B depicts a family watching content on a display, the display including an alert, and the family having access to the tablet of FIG. 1A, according to an exemplary embodiment.
Figure 2:
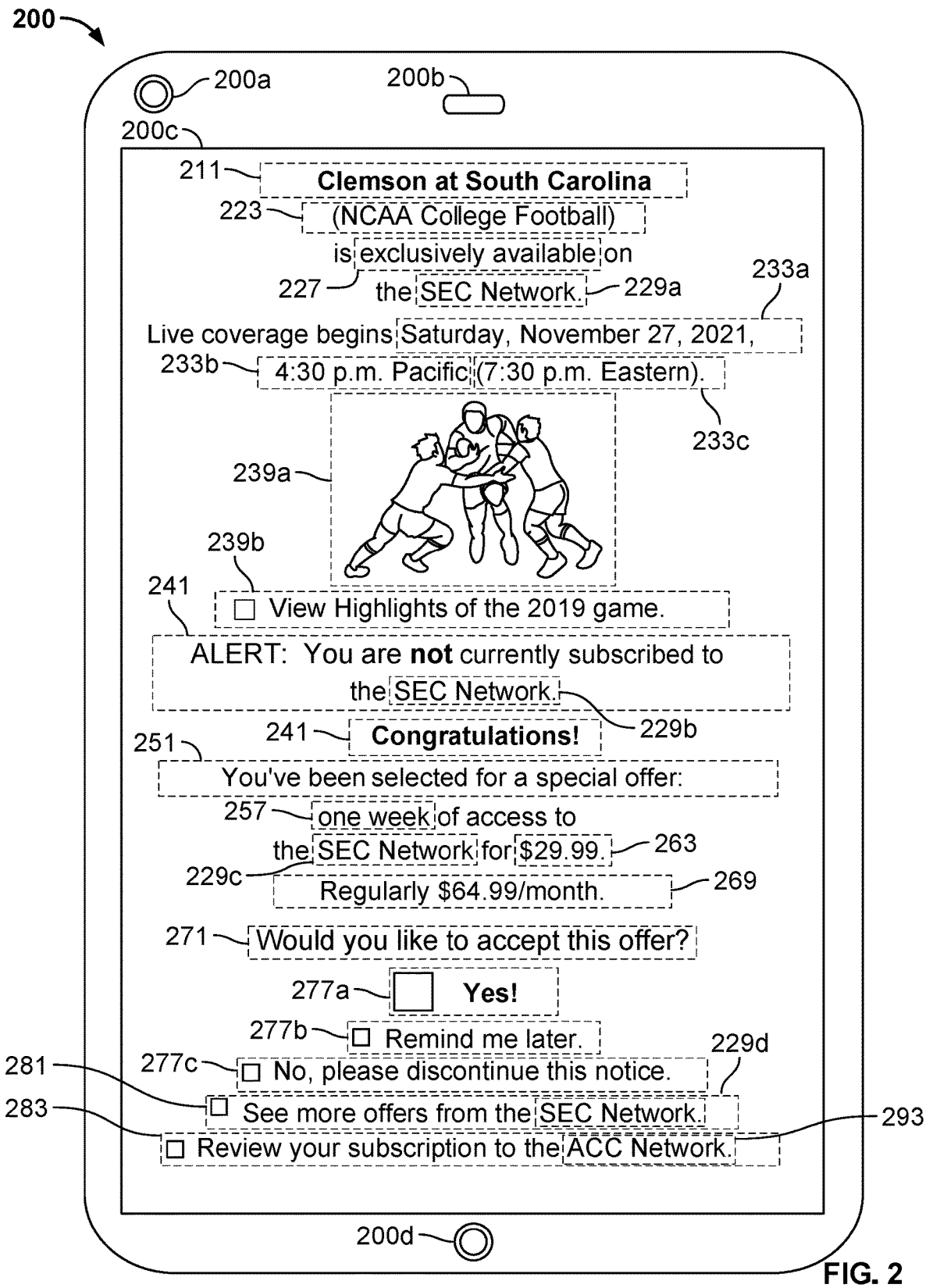
FIG. 2 depicts the tablet of FIGS. 1A and 1B, according to an exemplary embodiment.

FIG. 1A is an overview of an exemplary tablet 200, with details shown in FIG. 2. The tablet 200 may include an input device 200a, such as a rear-facing camera, an output/input device 200b, such as a dual-function speaker-microphone, an output device 200c, such as a display, an input device 200d, such as a home button, and an input device 200e, such as a stylus.

The tablet 200 may be configured to display on the display device 200c information pertaining to a recommendation regarding a subscription. Specifically, for example, the tablet 200 may be configured to display one or more of a title 211 of a content item (e.g., "Clemson at South Carolina"), a genre 223 of the content item (e.g., "(NCAA College Football)"), exclusivity verbiage 227 (e.g., "exclusively available"), a name 229a of a first streaming service (e.g., "SEC Network"), a date 223a of the content item (e.g., "Saturday, Nov. 27, 2021"), a local broadcast time 233b of the content item (e.g., "4:30 p.m. Pacific"), an original/native broadcast time 233c of the content item (e.g., "7:30 p.m. Eastern"), a preview 239a of a related content item (e.g., an image from the 2019 Clemson-South Carolina game), a selectable option 239b to view the related content item (e.g., "View Highlights of the 2019 game."), a notification 241 relating to a status of the user with respect to the first streaming service (e.g., "ALERT: You are not currently subscribed to the SEC Network."), a second identification 229b of the name 229a of the first streaming service, an enticing and/or positive statement 241 (e.g., "Congratulations!"), a special offer message 251 (e.g., You've been selected for a special offer"), a duration 257 of the offer (e.g., "one week"), a third identification 229c of the name 229a of the first streaming service, an offer 263 relating to the duration 257 of the offer (e.g., "$29.99"), comparison information 269 relating to the offer (e.g., "Regularly $64.99/month"), a prompt or inquiry requesting action by the user 271 (e.g., "Would you like to accept this offer?"), a selectable acceptance option 277a (e.g., "Yes!"), a selectable delay option 277b (e.g., "Remind me later"), a selectable opt-out option 277c (e.g., "No, please discontinue this notice"), a selectable additional related offers field 281 (e.g., "See more offers from the SEC Network"), a fourth identification 229d of the name 229a of the first streaming service, a selectable review of related current subscriptions field 283 (e.g., "Review your subscription to the ACC Network"), and a name 293 of a second streaming service (e.g., "ACC Network"). The selectable options are not limited to the radio buttons as shown in FIG. 2 and could include any suitable means for a user indicating an acceptance. Also, the functionality of FIG. 2 could be implemented via voice command.

One or more of the above-referenced types of information may be generated based on an analysis of one or more of a user profile, a subscription profile, a content profile, and a device profile. In some embodiments, prediction analysis is used to determine a likelihood that the user profile, the subscription profile, the content profile, and/or the device profile will be interested in consuming a given content item. The likelihood may be a percentage above a predetermined threshold or any other suitable expression of likelihood. The exclusivity verbiage 227 may be generated in response to a determination that a given content item is only available to the user profile, the subscription profile, the content profile, and/or the device profile from a single content provider in a market associated with the user profile, the subscription profile, the content profile, and/or the device profile. The preview 239a of a content item previously consumed may be generated based on an analysis of the user profile, the subscription profile, the content profile, and/or the device profile. If the system determines a content item of likely to be of interest to the user profile, the subscription profile, the content profile, and/or the device profile associated with a current user, and if the system further determines that the user profile, the subscription profile, the content profile, and/or the device profile does not have access to a source of the content item, then the system may be configured to transmit the alert 241 including the name 229b of the unsubscribed content source. The offer 263 may be based on a cost analysis and related determination of an offer price likely to result in selection of the content source, i.e., addition of a new subscription. The offer 263 may be less than (or in some cases more than) a regular price for the content source. The offer 263 may be for a shorter or longer duration than a regular subscription. The offer 263 may include an option to view a single content item for a limited time. The offer 263 may include unrestricted access to a subscription service. The type of offer, the price of the offer, the duration of the offer, and/or an extent of content access associated with the offer may be determined based on an analysis of the user profile, the subscription profile, the content profile, and/or the device profile. Also, the offer may be manually configured by a content provider.

Content may be distributed and/or broadcast by a content provider. The content provider may utilize a distribution and/or broadcast system 300 as shown, for example, in FIG. 3. The system 300 may include a server 305. The server 305 may be configured to transmit 310 content via any suitable method including a cloud distribution system 315. The server 305 may be configured to receive a content request 380 from a user. The distribution system 315 may be configured to transmit content to one or more recipients including a main display 350, a sub display 360, and/or an nth display 200, 370, via a main stream 320, a sub stream 325, and/or a sub stream n 330, respectively. The distribution system 315 may be configured to send 335 content to a local memory 340. The local memory 340 may be configured to cause 345 the local memory 340 to stream content to one or more devices including the main display 350, the sub display 360, and/or the nth display 200, 370. Each of the main display 350, the sub display 360, and/or the nth display 200, 370 may be configured to cast content between each device, e.g., the main display 350 may be configured to cast content to the sub display 360 and/or the nth display 200, 370, and the sub display 360 may be configured to cast content to the nth display 200, 370, and vice versa. Each of the main display 350, the sub display 360, and/or the nth display 200, 370 may be configured to request content 380 from the content provider, e.g., via the server 305.

Example 2: Caterina, the Úrsula Corberó Delgado Superfan

It is Sep. 1, 2021. Caterina, aged 16, from Barcelona, Spain, is a superfan of Úrsula Corberó Delgado. The system is configured to determine superfan status based on review of Caterina's social media viewing habits, including repeated viewing of the viral YouTube video released Sep. 1, 2021, titled, "Money Heist's Úrsula Corberó Breaks Down Her Perfectly Pink Makeup Routine|Beauty Secrets|Vogue," and other media content items including Corberó. The system is configured to review metadata of content items in order to determine that Corberó is a lead actress in Money Heist on Netflix. Season 5 of Money Heist begins Sep. 3, 2021. Caterina wants very much to see Corberó again and thus Money Heist, but Caterina has a limited budget and little interest in subscriptions in general including other Netflix offerings. Caterina makes an exception for Corberó. Last year, Caterina's parents ordered a subscription to Netflix to see Season 4 of Money Heist. Caterina binge watched the entire series until April 4. After viewing the entirety of Season 4, Caterina and her parents could have ended the subscription but forgot to. In September 2020, they discovered they were paying for the subscription without using it. Frustrated by the experience, Caterina's parents swore off all streaming subscriptions.

Fortunately, since Caterina's content provider utilizes the present methods and systems, Caterina's profile is accessed, a determination is made that Caterina has seen Corberó in a high percentage of content items in the content provider's library including Corberó, detects the repeated viewing of the YouTube viral video, determines with the predictive engine a high likelihood that Caterina is very likely to be interested in Season 5 of Money Heist, determines a match with the profile of Caterina's viewing patterns against the content file for Money Heist, and notes a previous cancellation of the Netflix subscription. Netflix administrators are presented with options to configure the system. The administrators configure the system to offer three month subscriptions for the price of one month to drive up subscribership. Netflix administrators also have options to offer autorenewal of the subscription and/or one-time only subscriptions with a known end date.

The system transmits to Caterina's media device a "special offer" for a Netflix subscription beginning in the month of September 2021 and ending in December 2021 for a one-time price of a single month subscription along with an advertisement for the upcoming Season 5 of Money Heist including the face of Corberó. The subscription is ordered. Netflix gains revenue it otherwise would have lost.

In late December 2021, the system, noting the dropped subscription from September 2020, and the renewed subscription in late August 2021, is configured to take a soft initial approach to upsell Caterina for an additional 12 months. The system transmits a holiday offer to Caterina's media device, 12 months for the price of 10.

Example 3: Vishwas, the Delhi Capitals Superfan

It is Apr. 1, 2022. Vishwas loves the Delhi Capitals, a cricket team competing in the Indian Premier League (IPL). Vishwas enjoyed the 2020 season, in which the Capitals placed second in the league stage of the IPL, reached the finals, and lost to the Mumbai Indians, and the 2021 season, where the Capitals made the playoffs only to lose in the qualifiers. The system is configured to access Vishwas's profile, determine that Vishwas subscribed to Disney+ Hotstar in 2020 and 2021, watched YouTube videos related to the Capitals, watched every Capitals match, and promptly unsubscribed from Hotstar at the end of the season. The system is configured to determine the start date of the 2022 season, to determine Vishwas's viewing pattern vis a vis the Capitals, and to transmit an offer to Vishwas's media device offering a Disney+ Hotstar subscription ahead of the 2021 IPL season including videos of highlights of the Delhi Capitals from 2021.

Channel Management Services (CMSs)

A CMS provides content providers and users with one or more interfaces for controlling content items, channels, accounts, subscriptions, and/or related information. The CMS recommends to the user what channels and/or subscriptions to swap. In some embodiments, the CMS is driven by one or more of big data analytics, machine learning, artificial intelligence, and the like (see, e.g., FIGS. 20 and 21 and related disclosures). The viewing experience of the user of the CMS is optimized to avoid missing a favorite content item. The CMS helps the user gain awareness of content items likely to be of interest accessible via channels and/or subscriptions that are not currently part of the user's line-up.

Example 4

In one embodiment, a CMS makes recommendations and/or automatically performs the task of unsubscribing to at least one channel and subscribing to a different channel that is not currently present in the subscriber's line-up, based on the shows/content offerings on both channels. For example, based on determining that one season of a TV series ended on Channel A but a different series that the user is interested in (and/or recommended to the user based on the user's preferences) is beginning on Channel B, the CMS service performs the task of swapping the channels.

Example 5

In one embodiment, the CMS is built and managed by a service provider; however, in another embodiment, the CMS is a central service, which is not associated with any service provider and can access any user subscription services via an application programming interface (API) if the user chooses to allow such access. The service provider provides account subscription data to such service. A business relationship exists between third party CMS providers and the service providers. In either case, the CMS has access to user preferences, including TV shows that they watch, how often they watch such shows (e.g., does the user watch a new episode live or do they wait until it is available on-demand, do they record it, do they wait until few episodes are available and binge-watch, etc.). Additionally, the CMS has access to profile data such as the number of people associated with the account that consume content on the various channels to determine who their viewing experience could be impacted by the channel exchange.

Some service providers allow the creation of profiles, which could indicate to the CMS how many people within a household that are associated with an account are utilizing the service, as well as which profile is watching what content. In cases where profiles are not available, other known techniques can be used to auto-generate profiles for members in a household. For example, such techniques are disclosed in U.S. patent application Ser. Nos. 17/503,997, and 17/504,007, filed Oct. 18, 2021, which are incorporated herein by reference in their entireties. Historical navigation patterns can be used distinguish between different users of a service—including data such as scrolling rate, trick play functions, watching patterns, commercial skips, etc.

This is important so that the subscription is not biased towards one profile. For example, one profile in the household might prefer to watch TV shows over movies, while another might prefer to watch movies and/or limited series.

However, the CMS algorithm can assign weights to various profiles associated with an account based on the amount of content that they consume through any service. This will also ensure fair allocation of the exchangeable channels.

The CMS collects information about content that is currently broadcasting on the channels that are available to be swapped out. For example, not every channel in the subscriber's line-up can be swapped—such determination is based on agreements between the networks and the service providers. However, the CMS could also have access to information about TV shows and movies that are available now and will be available in the next few weeks on any network. Such information is available and offered by the networks to populate the electronic programming guide for "now" and for the next X weeks, for example. This can be used to check if a specific content item is also available on the non-exchangeable channels.

Example 6

In one embodiment, the CMS adds metadata about upcoming shows and content from advertisements. For example, it is common for networks to advertise an upcoming show or a next season of a popular series ahead of time. Such "ad monitoring service" can extract such metadata and makes it available to the CMS. The "ad monitoring service" or AMS is just a module or component of the overall system and can monitor and analyze national advertisements during a broadcast via various known audio/video processing technologies to extract metadata such as name of the show, the network it will be available on, day the first episode will air, how long the show will last, etc. For example, if the numbers of episodes in a season is known, and the frequency of the broadcast of new episodes is also known, then the system can determine that the show will last for x-weeks or months.

Example 7

In one embodiment, the CMS schedules a recording of a content item if such content item will broadcast on a channel that will be swapped out that same day. For example, the last episode of Season X of a TV Series is scheduled to be broadcasted on Thursday on the TNT channel, but the CMS has the channel scheduled to be exchanged on that day. The CMS can automatically schedule the recording on a time-shift channel (i.e., different feeds for the eastern and pacific time zones—if available) and execute the channel swapping after a confirmation that the recording is complete (e.g., on a local DVR or network DVR). Similarly, an "Offering Profile" of the content item can be created and inspected. An "Offering Profile" is a data structure associated with a content item such as TV Series that is developed dynamically (e.g., during the broadcast of the series) that indicates whether the episodes get re-aired, how often they do, and whether the episodes are available on-demand after they air, and how long does it take for the episodes to be available on-demand, etc. This is important to match with the user's watching patterns that was discussed earlier (e.g., does the user watch the episode live or does he or she wait for few episodes to be available and binge-watches them, etc.).

The CMS can in some cases postpone the channel exchange to a future date. For example, the DVR or nDVR account might have limited recording space available (some live OTT services offer limited number of hours to subscribers—e.g., 50 hours of cloud recording). Such postponing can also occur if the CMS detects that a conflict will occur if such episode is added to the recording queue (e.g., other recordings have already been scheduled, etc.). In any case, the CMS is configured to make channel exchange decisions based on a prioritized checklist.

Example 8

In embodiments, where the CMS automatically performs the channel swapping or exchange, the user is notified of such action. For example, a notification can be displayed in the electronic programming guide (EPG) or the new channels that were added to the subscribers' lineup can be highlighted and/or displayed (e.g., in one group) the first time the guide is launched after the swapping takes place. Similarly, the notification can be displayed for every profile of the account (the determination of which profile is using the system at any given time was described earlier).

Example 9

In one embodiment, the subscriber can perform the channel exchange themselves based on a recommendation to do so by the CMS. For example, the CMS can generate for display a comparison table that summarizes the subscriber's viewing activity on any current channel (channel that the CMS recommends to swap) and the new TV Shows or content items that the subscriber will get access to if such channel exchange occurs. For example, the comparison table could indicate that the last episode of the show "Your Honor" has already aired and has been watched by the user (or has been recorded), and that swapping the SHO channel with TNT will give the user access to a TV series that they have been watching—for example, S6 of TV Series "Animal Kingdom" will start airing in 2 days. The CMS has access to the subscriber's watching profile and had already determined that at least one profile associated with the account has watched Season 5 of the TV Series "Animal Kingdom." In one embodiment, the CMS recommends multiple swapping options by displaying multiple "comparison tables" to assist the user in deciding.

Example 10

In one embodiment, the CMS might not recommend to the user to add the TNT channel to their lineup if it is determined that while at least one profile is consuming the show "Animal Kingdom," such profile is currently watching Season 4 (e.g., via a third party OTT service, or season 4 episodes have been recorded an a local or nDVR) and the user has not even consumed Season 5 yet. The CMS can determine if Season 5 is already available from the same source that the user is currently consuming Season 4 (e.g., did the user record S5 episodes and will watch them after finishing S4? etc.). In any case, the CMS must prioritize the shows of interest from all the various channels that are available to be added or removed from the subscriber's channel line-up based on content availability, a profile's urgent need for the content (based on how fast they tend to keep caught up), whether the content will re-air on a given network after the original content broadcasts, etc. TV series that are currently being consumed on channels that are available to be swapped out and TV Series offered by channels that match the user's profile/preferences that are available to be added to the subscriber's lineup are given weight to assist in determining what channels to select for exchange and what channels must remain in the subscriber's line-up. Many parameters disclosed earlier can be used as input and to determine which channels should be exchanged.

It is important to mention that weights are dynamic and change over time, for example, a profile might lose interest in each show and therefore the weight associated with such show is reduced. Similarly, a profile might gain interest in another show, and the weight associated with that show is increased. This assists the CMS in making better predictions and recommendations for channel swapping.

Example 11

In one embodiment, an add-on is suggested to the user if it is determined that based on the timing of various shows that the user is watching/following, the subscriber should consider the add-on. The add-on can be a subscription to a channel collection via the TV Service or an expansion of the subscriber's current package (e.g., an upgrade that would result in the addition of 3 more channels to the subscriber's line-up). Additionally, an add on could be a subscription to a third party OTT service via the current TV service. For example, the CMS might determine that the subscriber or profiles associated with the account are only likely to watch one show if the TNT network is added to their line-up, however, the subscriber or profiles associated with the account are likely to watch many content items if a different channel was added to their line-up instead. Therefore, the CMS can recommend a subscription to TNT as an-add on.

The CMS's performance will depend on much access to data it has. For example, the CMS can make great decisions based on knowing which third party services (e.g., OTT apps) the user has access to (for free or a fee). Since the CMS will be querying such services for the digital catalogues to make informed decisions about channel swapping. It is also expected that the viewing progress of content items (e.g., TV Shows) is also accessible to the CMS either via the TV service or other means such as data exposed by the third party app providers and available to be queried by the CMS.

Exemplary Embodiments

Figure 3:
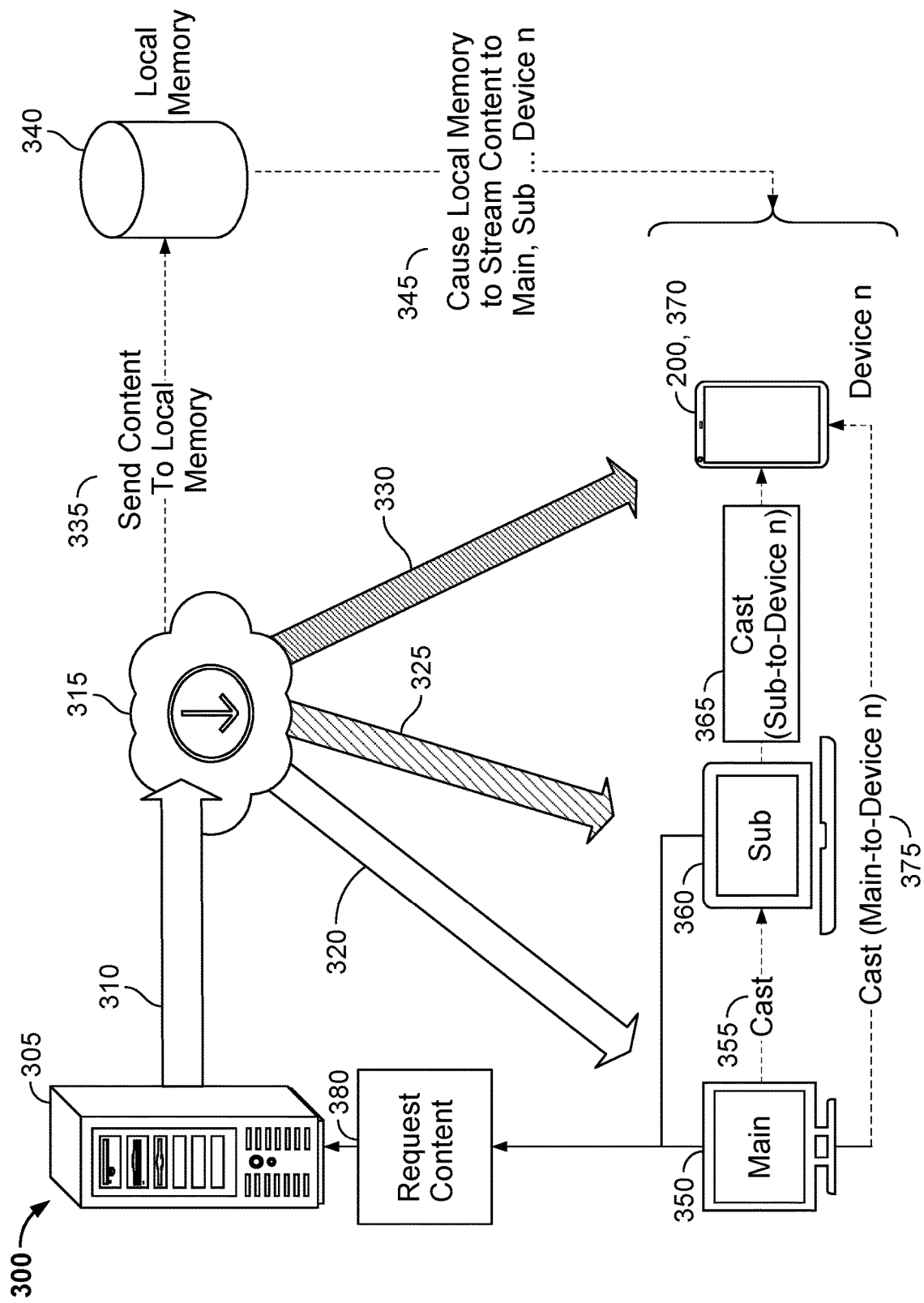
FIG. 3 depicts a server and distribution system according to an exemplary embodiment.
Figure 21:
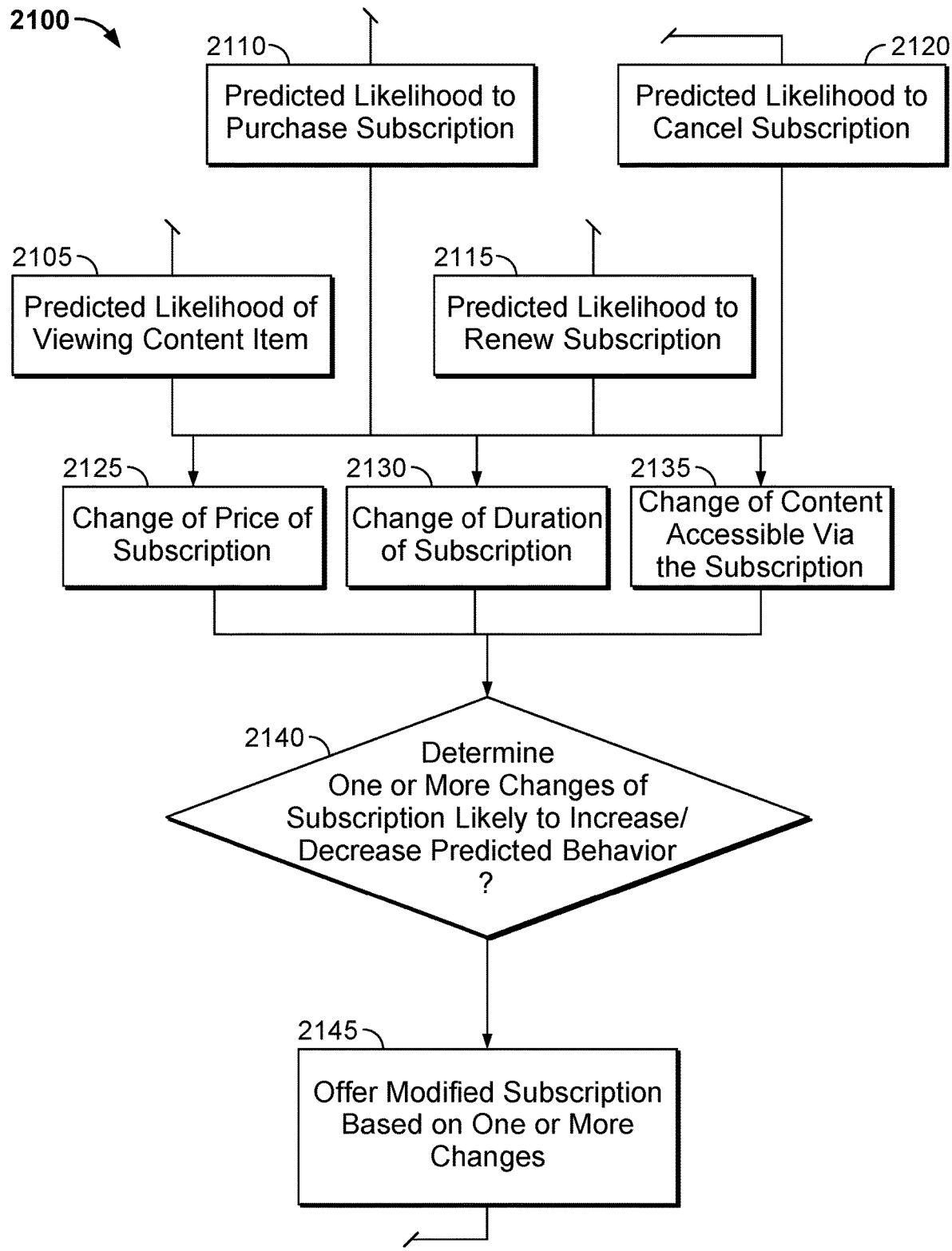
FIG. 21 depicts a subscription prediction process according to an exemplary embodiment.
Figure 22:
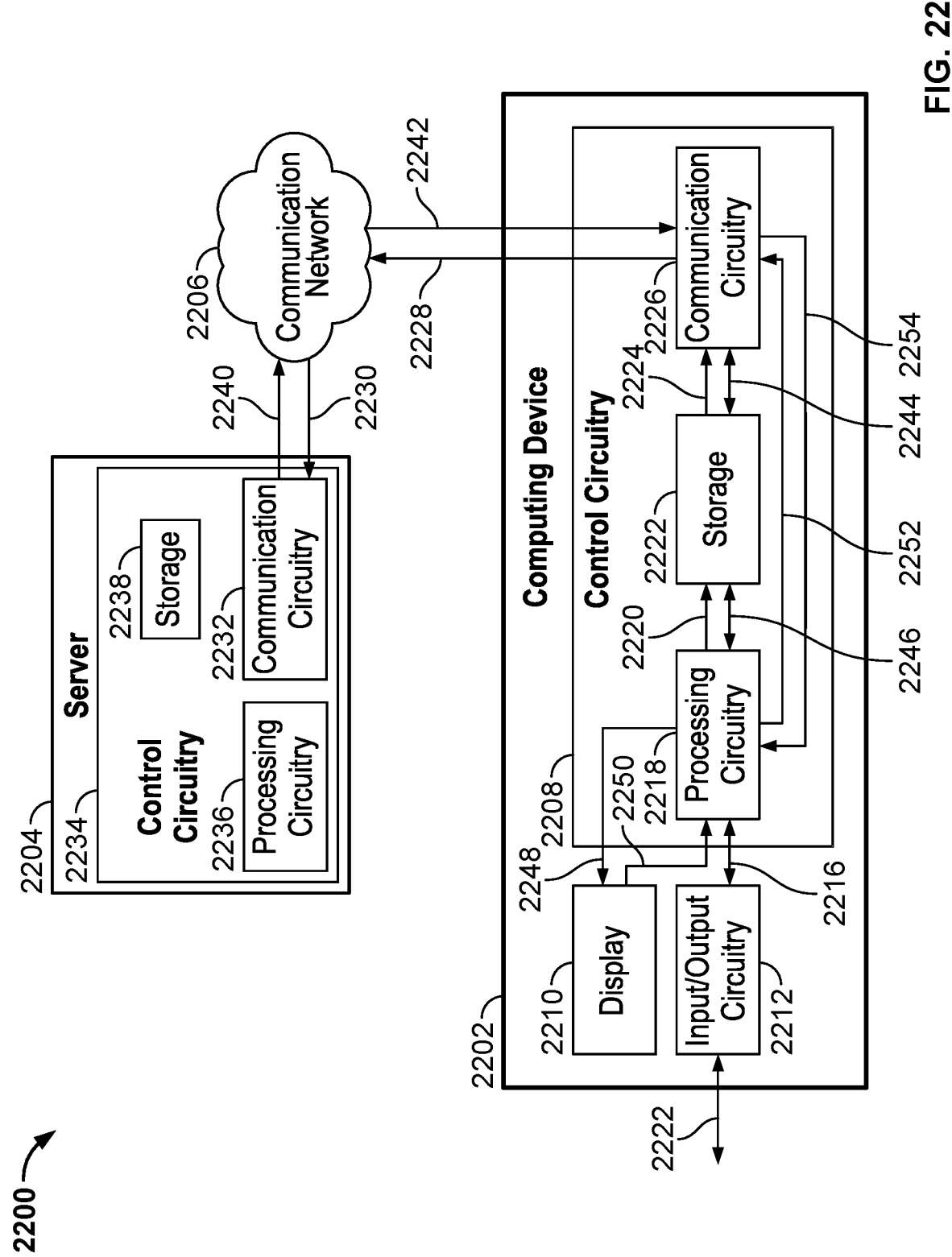
FIG. 22 depicts a system including a server, a communication network, and a computing device according to an exemplary embodiment.

In general, either or both of the system 300 of FIG. 3 and the system 2200 of FIG. 22 may be configured to perform one or more of the functions of the processes 400, 500, 700, 800, 900, 1000, 1100, 1300, 1400, 1500, 1600, 1700, 1800, 1900, 2000, 2100 of FIGS. 4, 5, 7, 8, 9, 10, 11, 13, 14, 15, 16, 17, 18, 19, 20, and 21, and/or may be configured to output one or more of the GUI's shown, for example, in FIGS. 1A, 2, 6, and 12. Any of the functions, processes, and methods and connections therebetween disclosed herein may be duplicated, omitted, rearranged, reversed, and/or substituted in any suitable manner.

Figure 4:
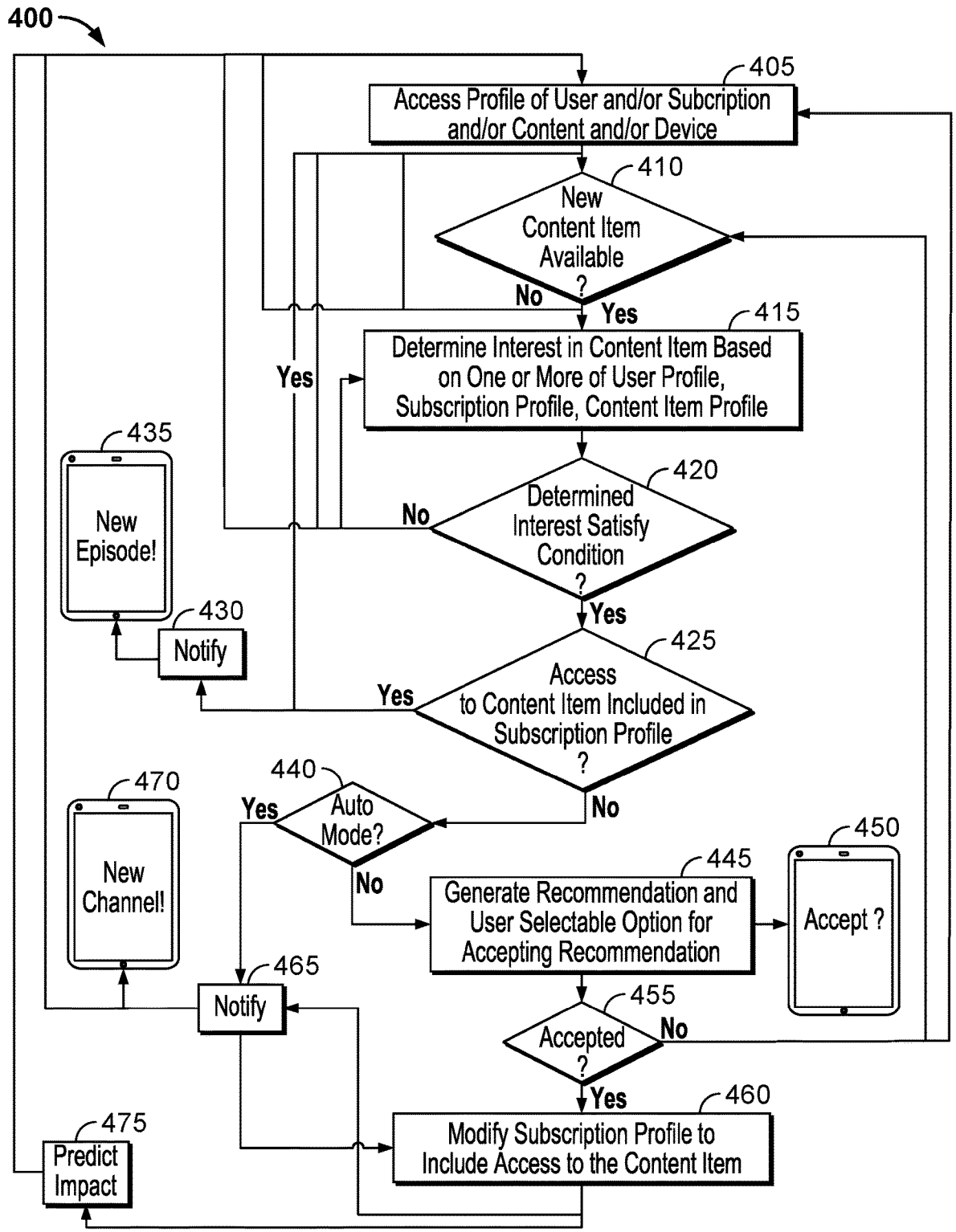
FIG. 4 depicts a subscription recommendation process according to an exemplary embodiment.

In some embodiments, as shown, e.g., in FIG. 4, the system 300, 2200 may be configured to perform one or more functions of process 400. The process 400 may include accessing 405a user profile and/or a subscription profile and/or a content profile and/or a device profile. An availability 410 of a new content item may be determined. An interest in a content item is determined 415 based on the user profile and/or the subscription profile. In response to the determined interest satisfying a condition 420, access to the content item is determined to be included in the subscription profile 425. The method includes, in response to determining 425 that access to the content item is not included in the subscription profile, modifying 460 the subscription profile to include access to the content item. In some embodiments, detailed below, recommendations are generated. The recommendations may utilize an improved catalog of one or more content items for achieving improved control.

In some embodiments, the method includes, in response to determining 425 that access to the content item is not included in the subscription profile, generating 445a recommendation and a user selectable option for accepting the recommendation. In some embodiments, in response to determining 425 that access to the content item is included in the subscription profile, a notification may be generated 430 and transmitted for display on a user device 435. In some embodiments, the method includes, in response to determining 425 that access to the content item is not included in the subscription profile, a determination 440 is made of whether an automatic mode is active or not. In some embodiments, in response to determining 440 that the automatic mode is active, a notification may be generated 465 and transmitted for display on a user device 470.

Figure 5:
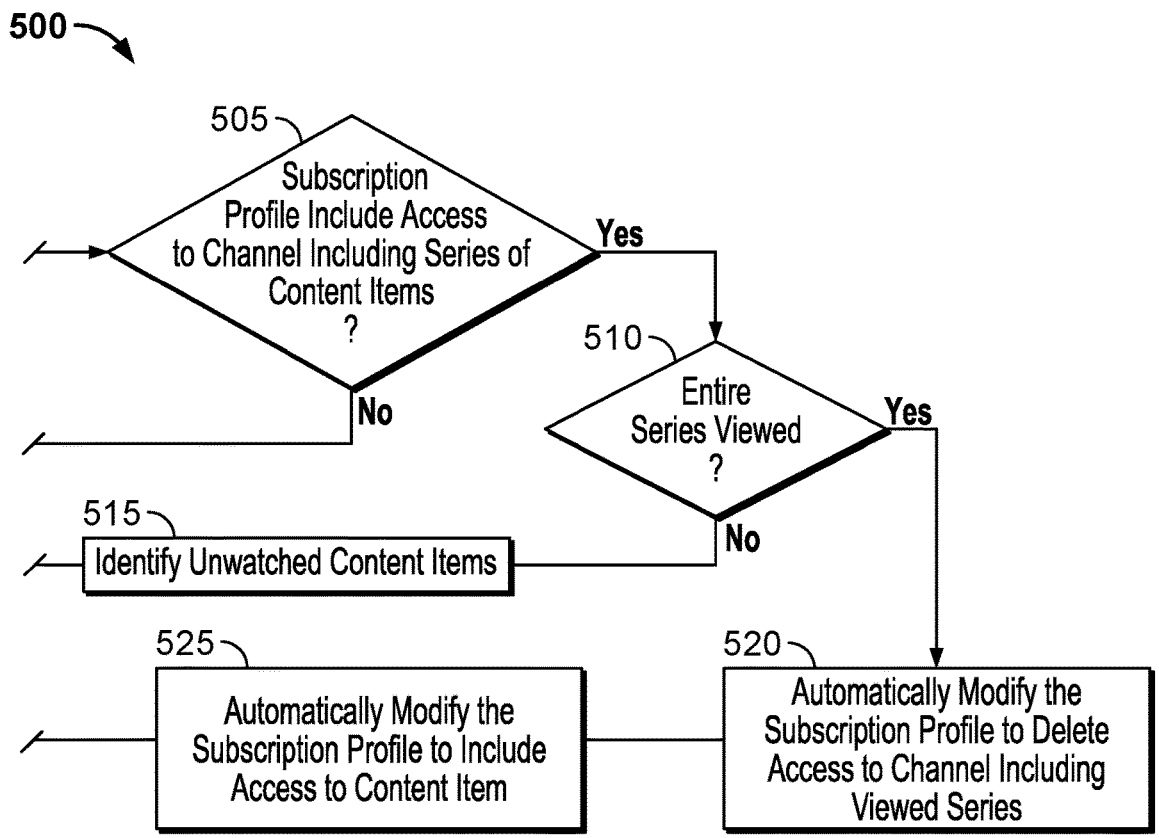
FIG. 5 depicts a process for automatic subscription modifications according to an exemplary embodiment.
Figure 6:
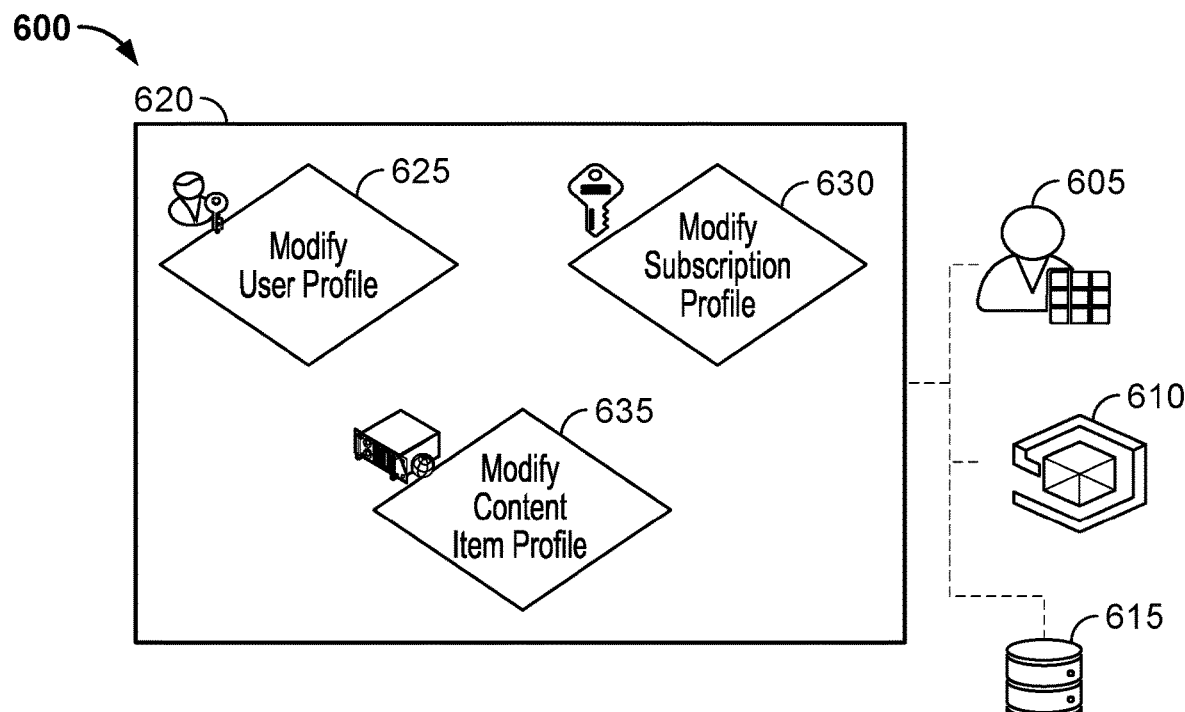
FIG. 6 depicts a UI for a content provider according to an exemplary embodiment.
Figure 7:
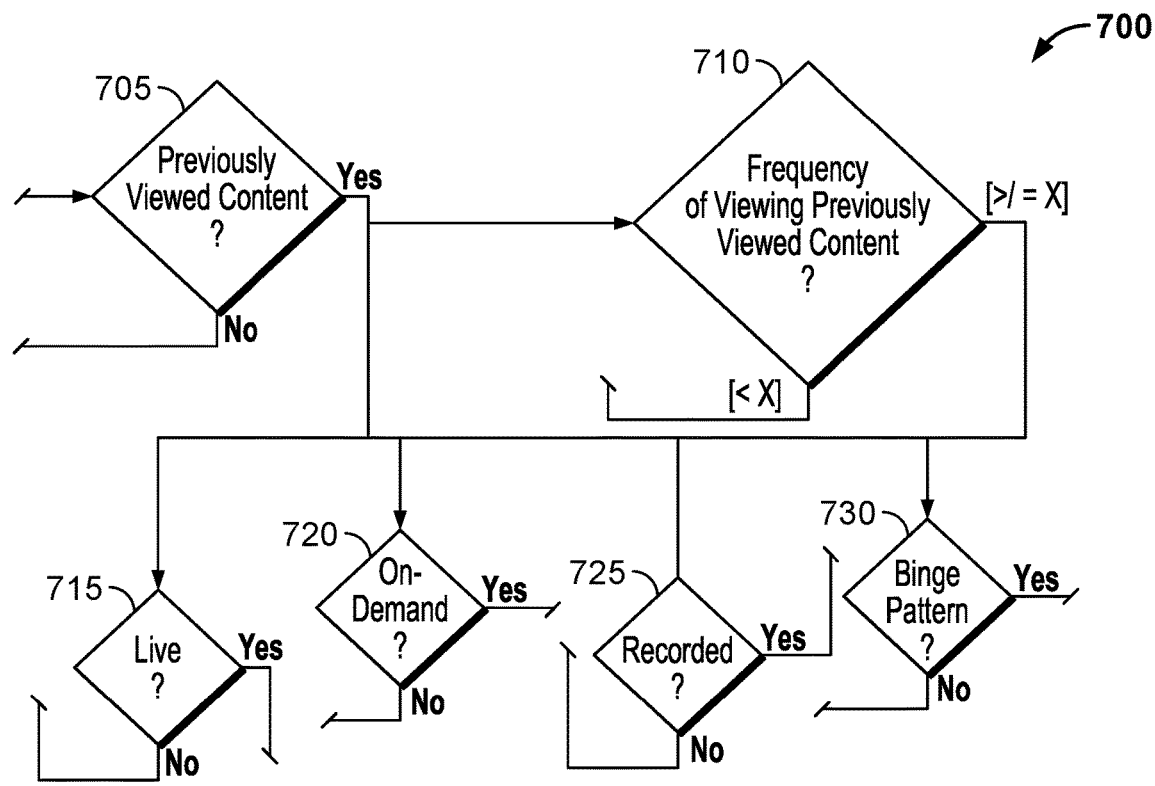
FIG. 7 depicts a previously viewed content analysis process according to an exemplary embodiment.
Figure 8:
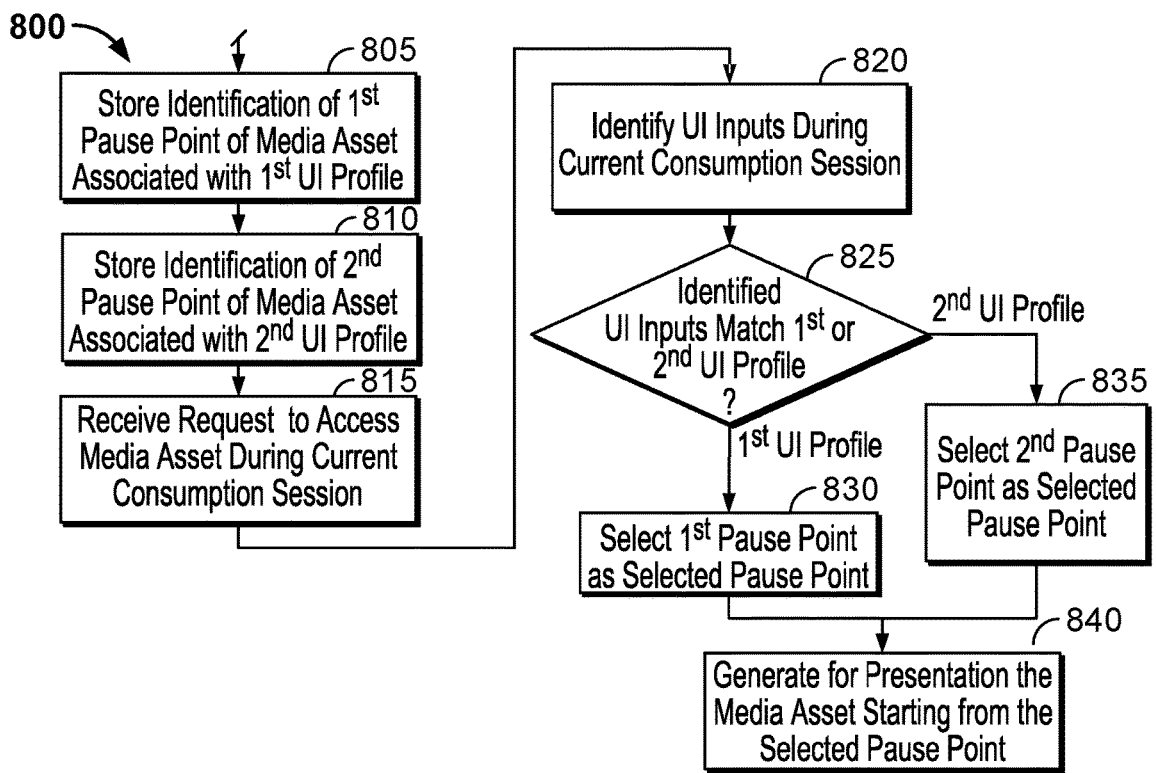
FIG. 8 depicts a pause point analysis process according to an exemplary embodiment.
Figure 9:
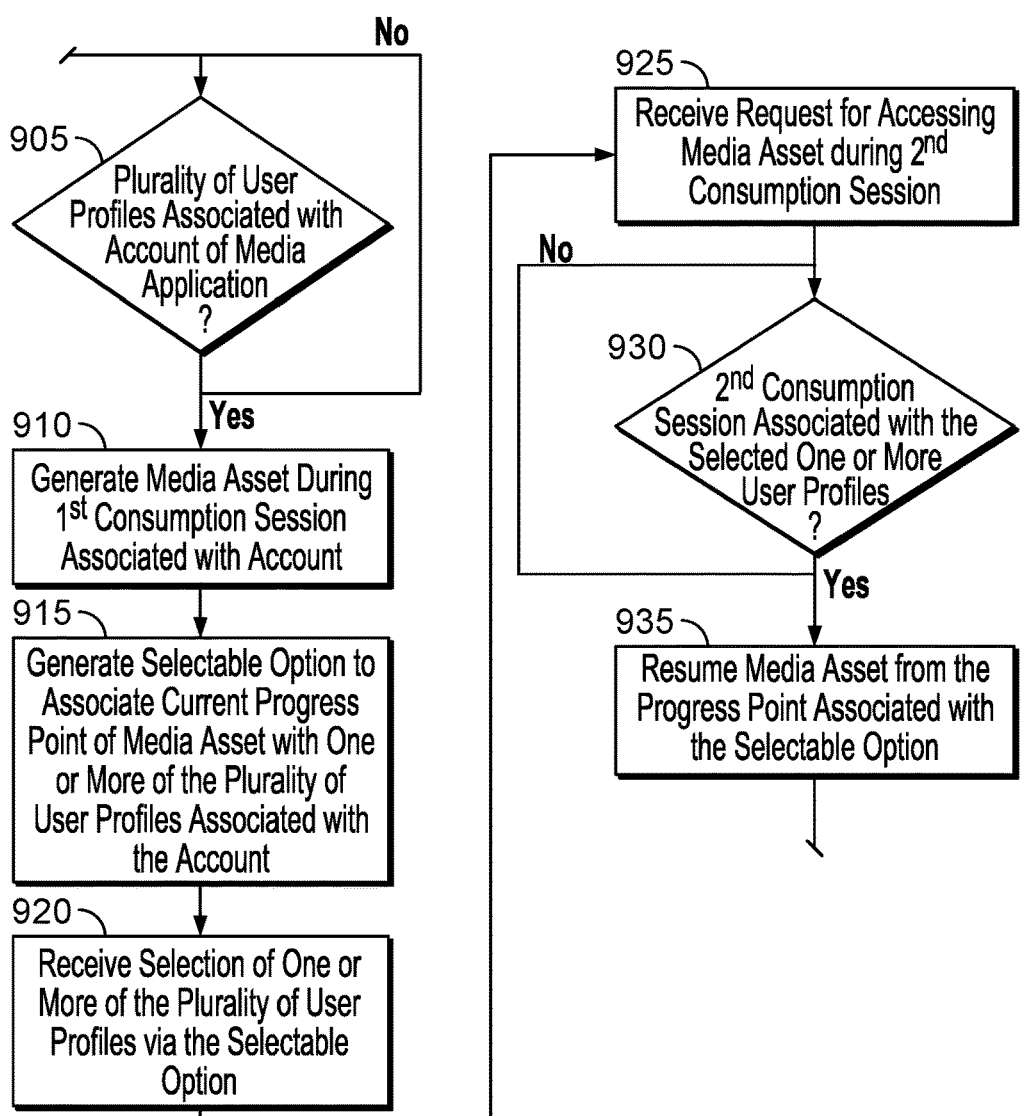
FIG. 9 depicts a progress point analysis process according to an exemplary embodiment.
Figure 10:
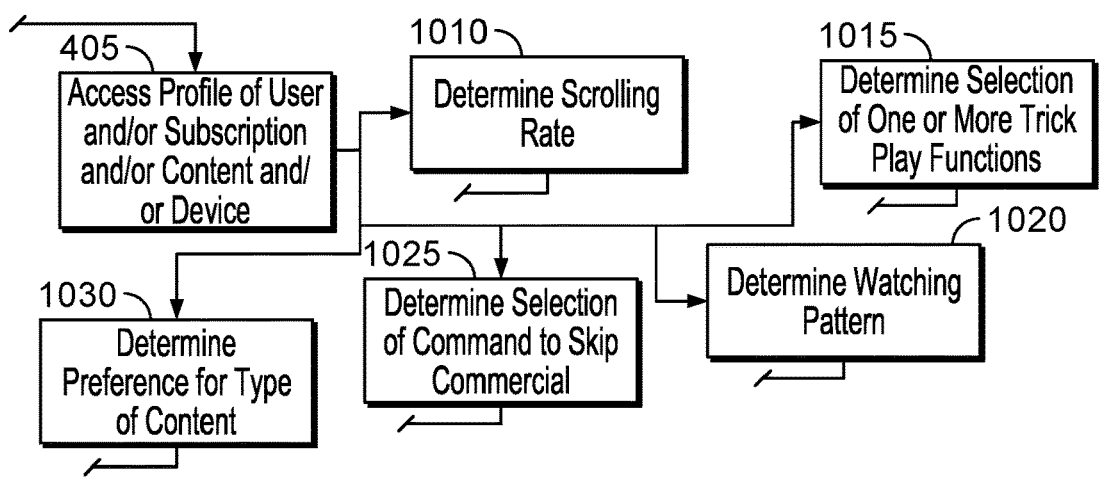
FIG. 10 depicts a user interaction determination process according to an exemplary embodiment.
Figure 11:
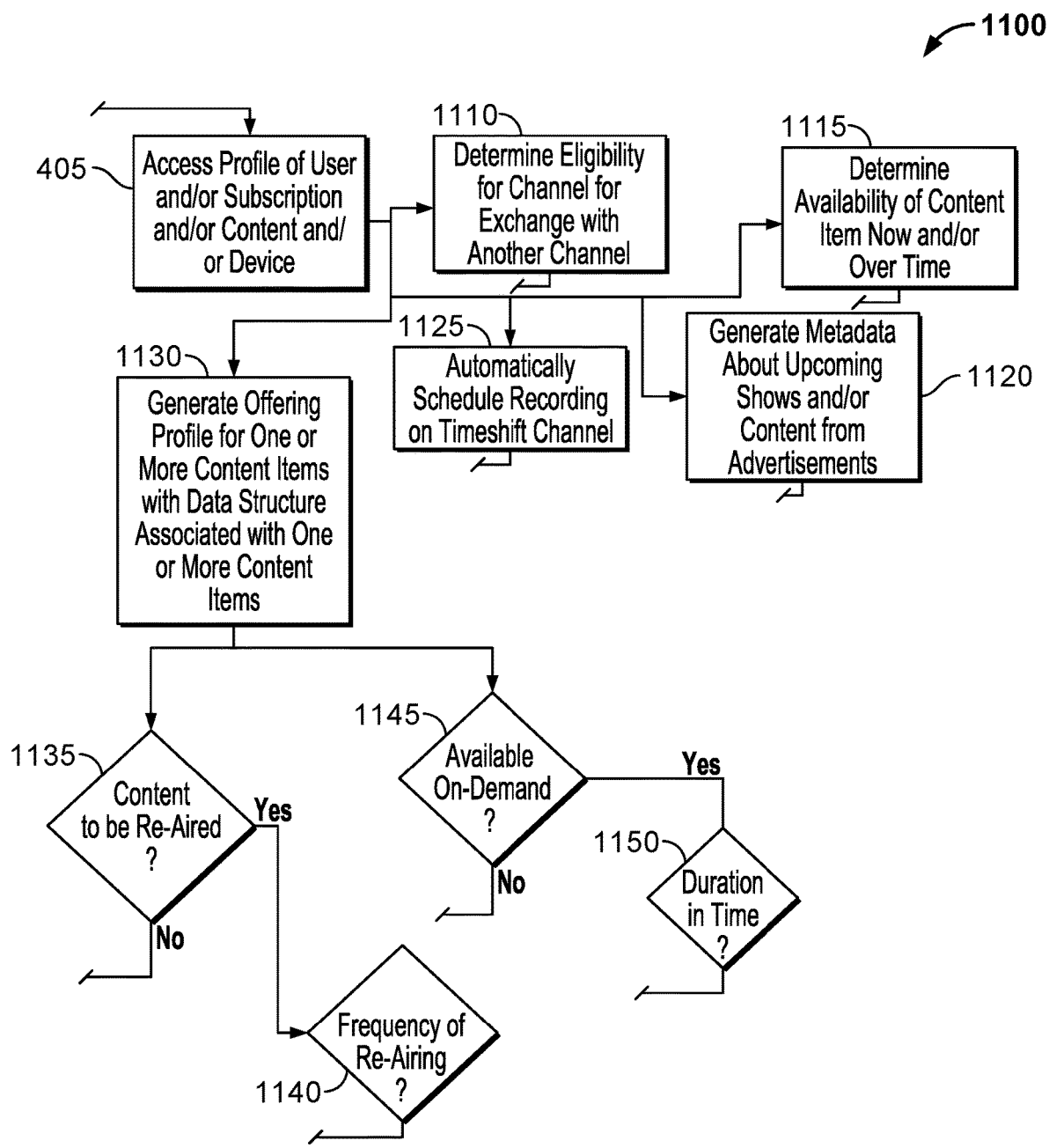
FIG. 11 depicts subscription, content, metadata, recording, and offering analysis processes according to an exemplary embodiment.
Figure 12:
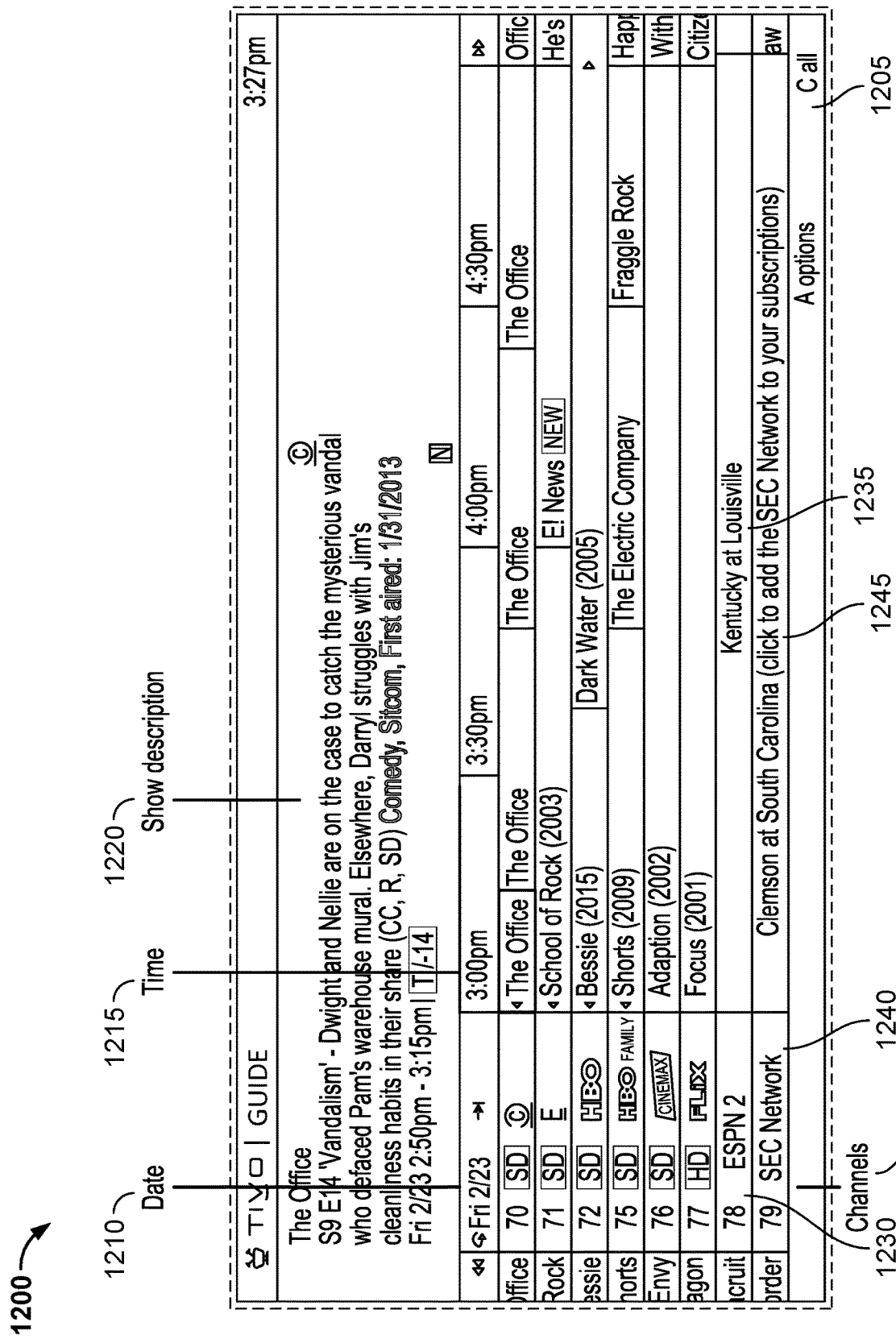
FIG. 12 depicts an electronic programming guide (EPG) including one or more additional subscription channels according to an exemplary embodiment.
Figure 13:
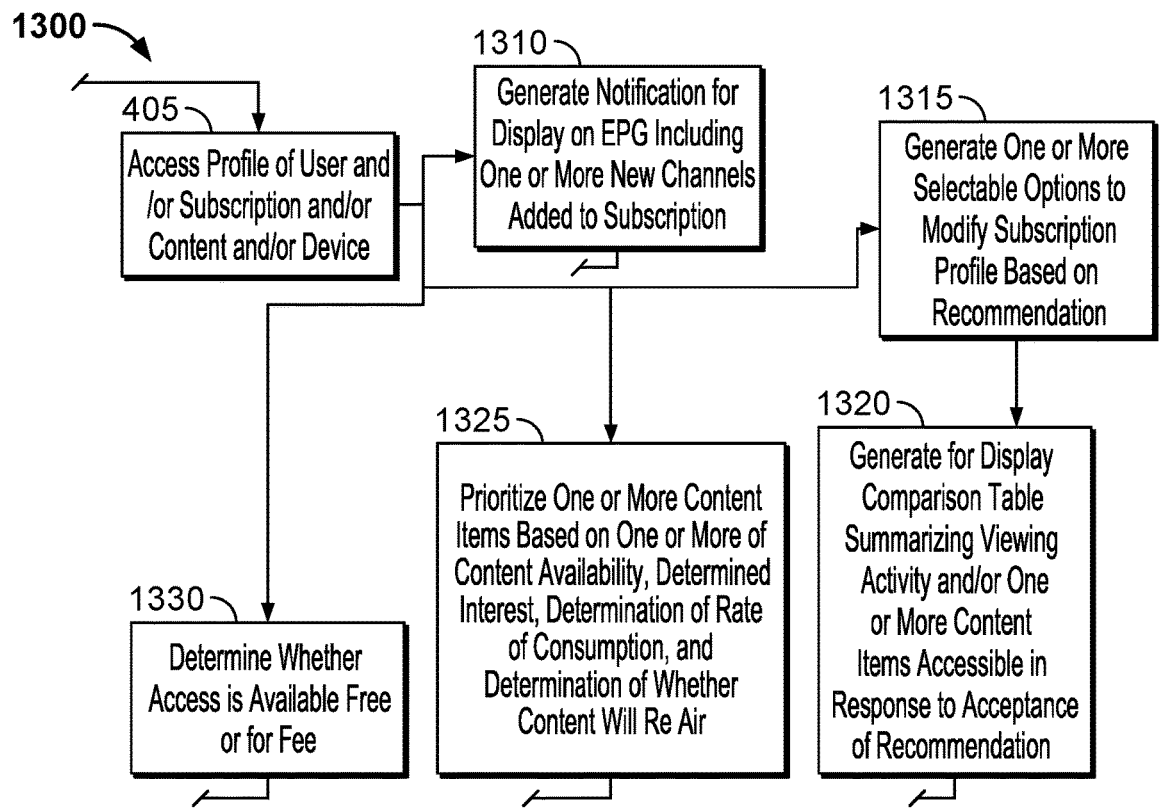
FIG. 13 depicts an EPG display and prioritization process according to an exemplary embodiment.
Figure 14:
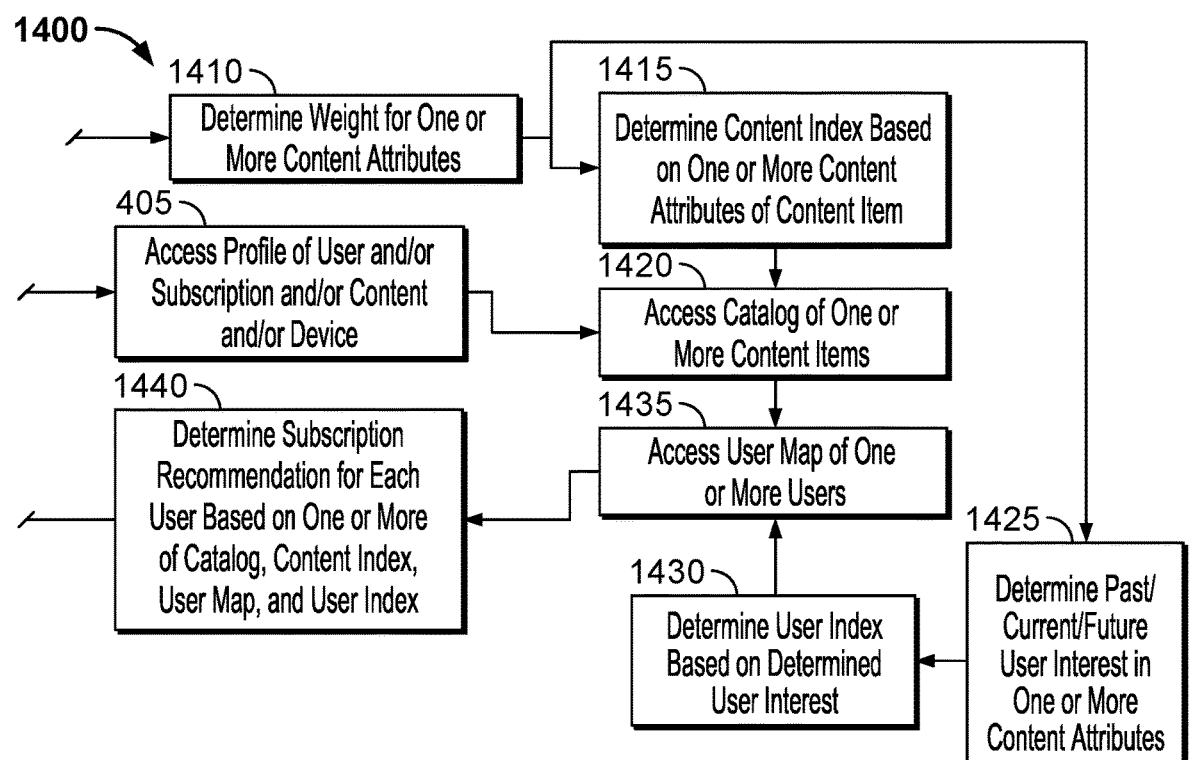
FIG. 14 depicts a catalog and index mapping and subscription recommendation process according to an exemplary embodiment.
Figure 15:
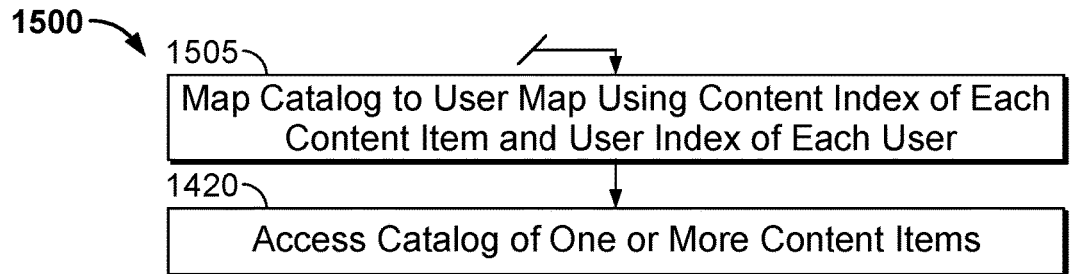
FIG. 15 depicts a catalog mapping process according to an exemplary embodiment.
Figure 16:
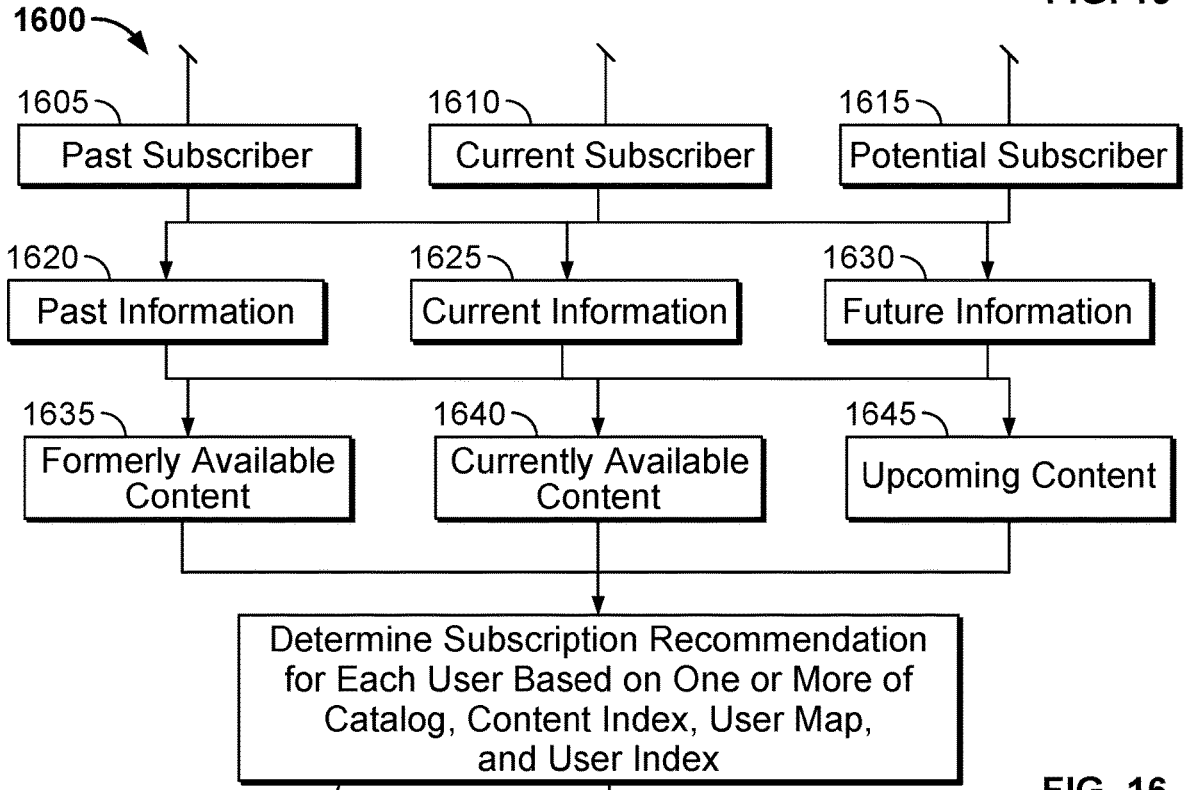
FIG. 16 depicts a subscription recommendation process according to an exemplary embodiment.
Figure 17:
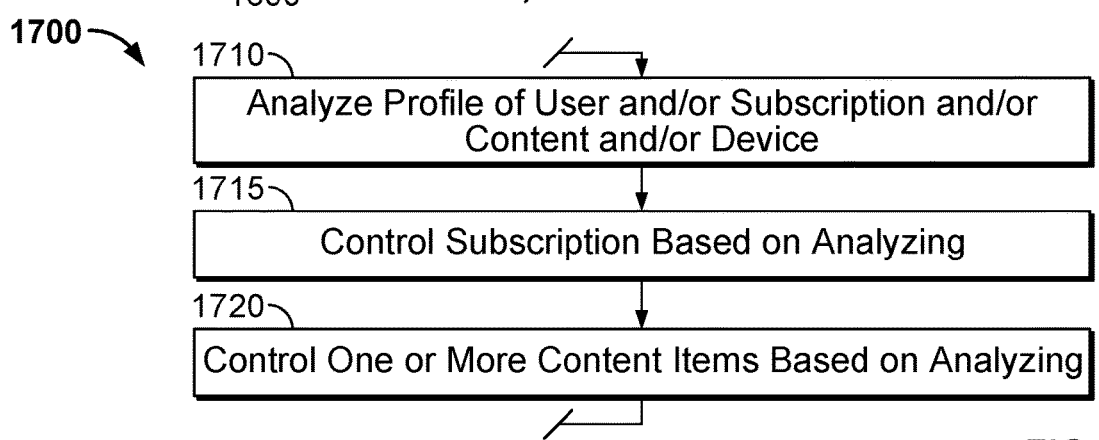
FIG. 17 depicts a subscription and content item control process according to an exemplary embodiment.
Figure 18:
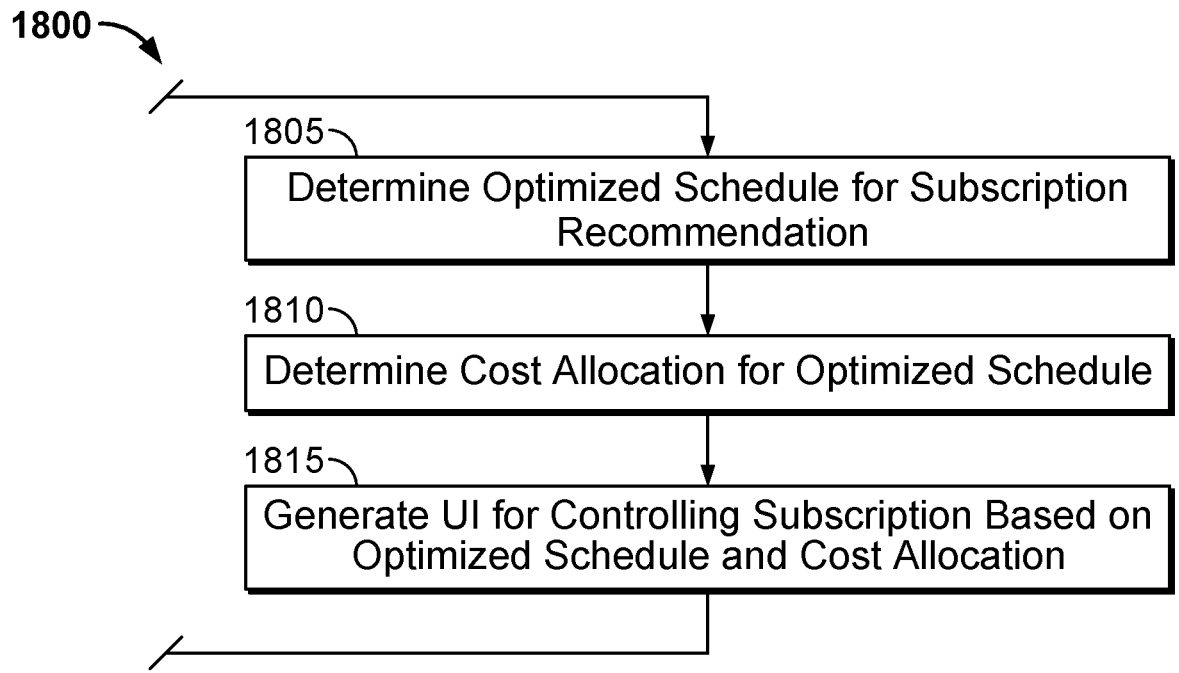
FIG. 18 depicts a subscription control process according to an exemplary embodiment.
Figure 19:
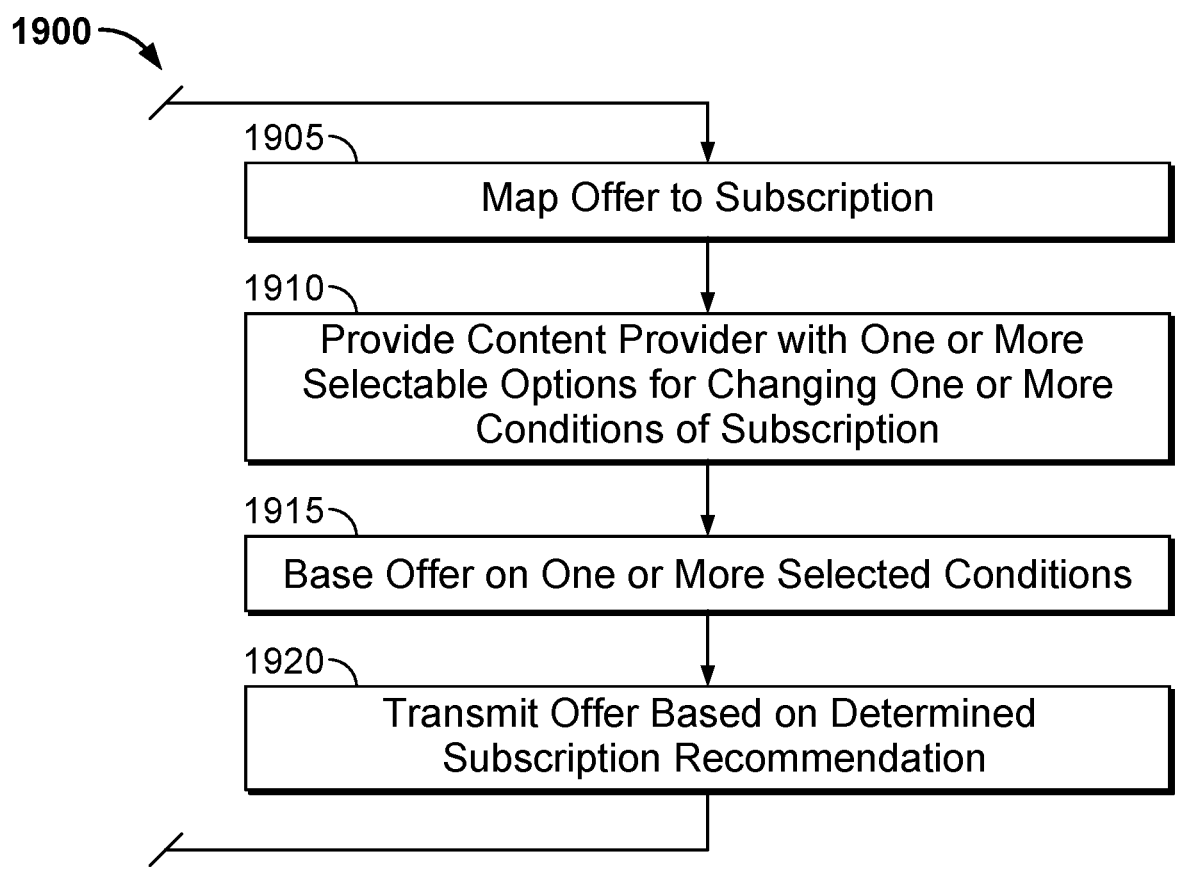
FIG. 19 depicts an offer generation and transmission process according to an exemplary embodiment.

In some embodiments, as shown, for example, in FIG. 5, the method includes a process 500 including determining 505 that the subscription profile includes access to a channel including a series of content items. The method includes determining 510 that an entirety of the series was viewed. If it is determined 510 that the entirety of the series is not viewed, then unwatched content items may be identified 515. The method includes automatically modifying 520 the subscription profile to delete access to the channel including the viewed series while automatically modifying 525 the subscription profile to include the access to the content item of interest. In some embodiments, the automatic mode 440 is configured, selected, and/or determined, which prompts a user to select automatic modification of the subscription in response to a determination that a future content item is likely to be of interest to the user.

In some embodiments, the method includes generating a GUI 600 for a service provider 605 one or more selectable options for modifying one or more of the user profile 625, the subscription profile 630, and the content item profile 635. Each of the selectable options for modifying one or more of the user profile 625, the subscription profile 630, and the content item profile 635 may be configured to trigger display of suitable options for modifications (not shown).

In some embodiments, the method includes generating for a central service 610 one or more selectable options for modifying the one or more of the user profile 625, the subscription profile 630, and the content item profile 635.

In some embodiments, the method includes generating for a user a selectable option to grant or deny access to the subscription profile via an application programming interface (API). That is, the selectable option (e.g., "Accept?") may be generated and transmitted for display on a user device 450.

In some embodiments, the method includes receiving account subscription data from a service provider 605. The account subscription data may be stored in a storage device 615 accessible to the service provider 605 and/or the central service 610.

In some embodiments, the method includes a process 700 of determining 705 one or more of: previously viewed content items, a frequency 710 of viewing the one or more previously viewed content items, whether a new episode of a new content item is viewed in one or more of a live viewing state 715, an on-demand viewing state 720, in a recorded state 725, and in a binge pattern state 730.

In some embodiments, the method includes predicting 475 an impact on a viewing experience of one or more users in response to the modifying the subscription profile to include access to the content item (see, e.g., FIG. 21).

In some embodiments, the method includes a process 800 of storing 805 an identification of a first pause point of a media asset associated with a first user interaction profile. The method includes storing 810 an identification of a second pause point of the media asset associated with a second user interaction profile. The method includes receiving 815 a request to access the media asset during a current consumption session. The method includes identifying 820 user interface inputs received during the current consumption session. The method includes selecting one of the first pause point 830 and the second pause point 835 as a selected pause point based on determining 825 whether the identified user interface inputs match user interface inputs associated with the first user interaction profile or the second user interaction profile. The method includes generating 840 for presentation the media asset starting from the selected pause point.

In some embodiments, the method includes a process 900 of determining 905 that a plurality of user profiles is associated with an account of a media application. The method includes generating 910 for presentation a media asset during a first consumption session associated with the account. The method includes generating 915 for presentation a selectable option to associate a current progress point of the media asset with one or more of the plurality of user profiles associated with the account. The method includes receiving 920 a selection of one or more of the plurality of user profiles via the selectable option. The method includes, during a second consumption session, receiving 925 a request for accessing the media asset. The method includes, in response to determining 930 that the second consumption session is associated with the selected one or more user profiles, resuming 935 the media asset from the progress point associated with the selectable option.

In some embodiments, the method includes a process 1000 of determining, for each user profile of a plurality of user profiles, one or more of a scrolling rate 1010, selection of one or more trick play functions 1015, a watching pattern 1020, selection of a command to skip a commercial 1025, and a preference for a type of content 1030.

In some embodiments, the method includes a process 1100 of determining 1110 in the subscription profile an eligibility for a channel to be exchanged for another channel. In some embodiments, the method includes determining 1115 whether one or more content items are available now and/or will be available over a given time period. In some embodiments, the method includes generating 1120 metadata about upcoming shows and/or content from advertisements. In some embodiments, the method includes automatically scheduling 1125 of a recording on a timeshift channel. In some embodiments, the method includes generating 1130 an offering profile for one or more content items, the offering profile including a data structure associated with the one or more content items. In some embodiments, the data structure includes information indicating whether the one or more content items are scheduled to be re-aired 1135, a frequency of the one or more content items scheduled to be re-aired 1140, whether the one or more content items are available on-demand 1145, and a duration in time for the one or more content items to be available on-demand 1150.

In some embodiments, the method includes a process 1300 of generating 1310 a notification for display on an electronic programming guide (EPG) 1200 including one or more new channels added to the subscription profile. The exemplary EPG 1200 of FIG. 12 includes a display area 1205 including one or more of a date 1210, a time 1215, a show description 1220, a channel 1225, a first channel title 1230, a first program title 1235 for the first channel, a second new channel title 1240, and a second program title 1245 for the second new channel. In some embodiments, the second program title 1245 for the second new channel may include verbiage indicating that selection of the second program title 1245 will add a subscription to the associated channel, e.g., "Clemson at South Carolina (click to add the SEC Network to your subscriptions)." Other suitable selectable options may be provided.

In some embodiments, the method includes a process 1300 for generating 1315 one or more selectable options to modify the subscription profile based on a recommendation determined in response to the determined interest satisfying a condition. In some embodiments, the method includes generating 1320 for display a comparison table summarizing a viewing activity and one or more content items that are accessible in response to acceptance of the recommendation. In some embodiments, the method includes prioritizing 1325 one or more content items based on one or more of content availability, the determined interest in the one or more content items, a determination of a rate of consumption of previously viewed one or more content items, and a determination of whether one or more content items will re-air. In some embodiments, the method includes determining 1330 whether the access is available free or available for a fee.

In some embodiments, the method includes a process 1400 of accessing 1420 a catalog of one or more content items. The catalog includes, for each of one or more content providers, and for each content item, a content index (e.g., Table 1) based on one or more content attributes of the content item 1415. The method includes accessing 1420 a user map of one or more users. The map includes, for each of one or more time periods, and for each user, a user index (e.g., Table 2) based on a determined user interest in the one or more of the content attributes 1430. The method includes determining 1440 a subscription recommendation for each user based on one or more of the catalog, the content index, the user map, and the user index.

In some embodiments, the one or more content attributes include: a title, a genre, a microgenre, an actor, an age, an expiration date, an n-th language, an (n+1)-th language, a running time, a time slot, a date of production, a rating, a user-defined content attribute, and a customized content attribute. The content index includes a weight for each of the one or more of the content attributes.

In some embodiments, the determined user interest includes a determined past user interest in the one or more of the content attributes, a determined current user interest in the one or more of the content attributes, and a determined predicted future user interest in the one or more of the content attributes 1425. The user index includes a weight for each of the one or more of the content attributes.

Figure 20:
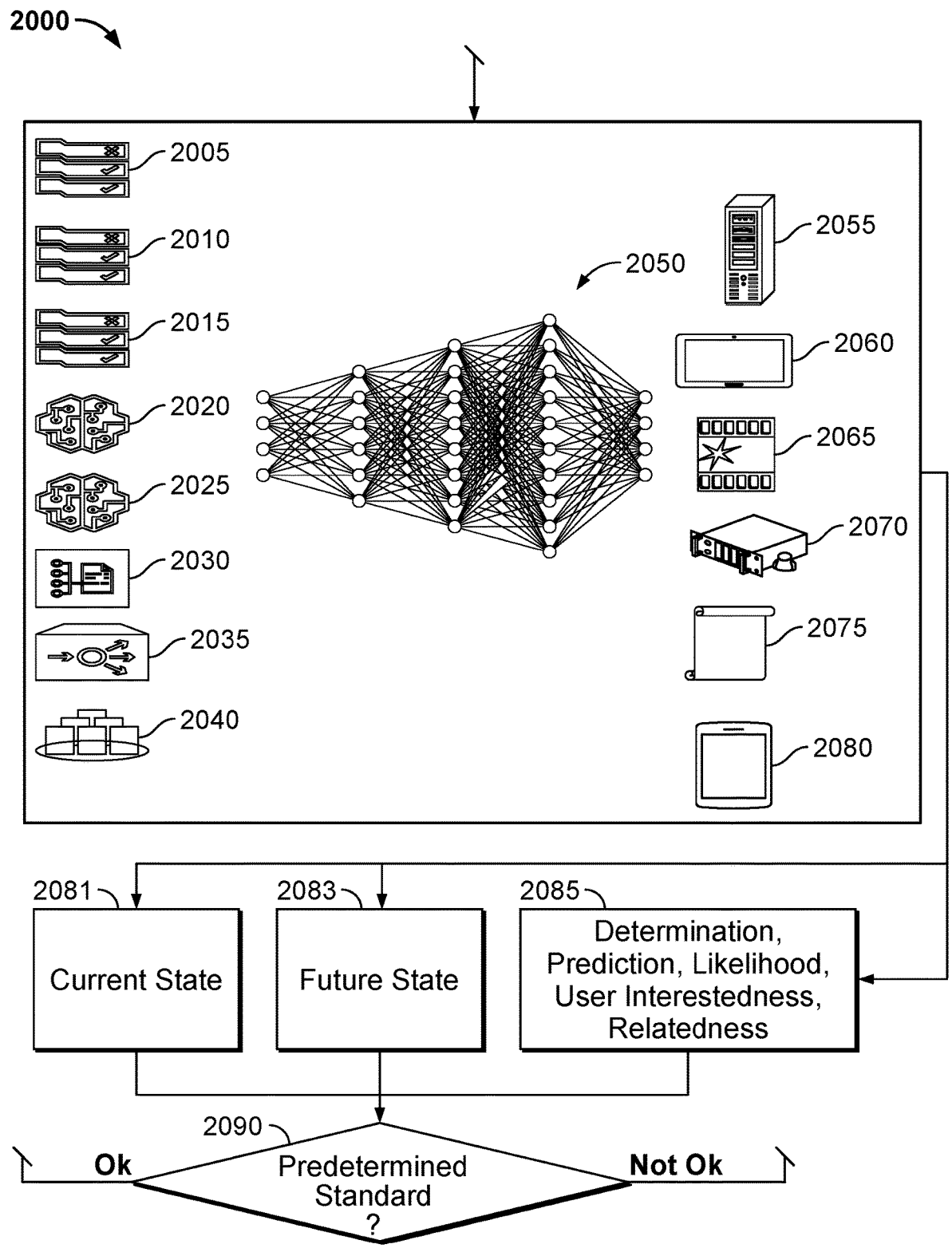
FIG. 20 depicts an artificial intelligence system according to an exemplary embodiment.

In some embodiments, the determined user interest is based on a determination by one or more of a machine learning technique, a predictive model, a model training technique, data selection, data sourcing, data synthesis, an analytical technique, a regression analysis, a classification analysis, a neural network, data engineering, data modeling, operationalization using registration, a deployment, monitoring, and a retraining technique (see, e.g., FIG. 20).

In some embodiments, a process 1500 includes mapping 1505 a catalog to the user map using the content index of each content item and the user index of each user.

In some embodiments, a process 1600 includes the determining 1650 of the subscription recommendation for each user may include one or more of: a subscription recommendation for a past subscriber 1605, a subscription recommendation for a current subscriber 1610, and a subscription recommendation for a potential subscriber 1615. The determining 1650 of the subscription recommendation for each user may be further based on one or more of: past information 1620 based on formerly available content 1635 from the one or more content providers, current information 1625 based on currently available content 1640 from the one or more content providers, and future information 1630 based on upcoming content 1645 from the one or more content providers.

In some embodiments, the method includes a process 1700 of analyzing 1710 one or more of: one or more media devices accessing a streaming service, a user profile of the user linked to the one or more media devices connected to the streaming service, and the content item or content items sent to and/or received from the one or more media devices. The method includes controlling 1715 the subscription based on the analyzing. The method includes controlling 1720 the one or more content items based on the analyzing.

In some embodiments, the method includes a process 1800 of determining 1805 an optimized schedule for the subscription recommendation. The method includes determining 1810 a cost allocation for the optimized schedule. The method includes generating 1815 a user interface for controlling the subscription based on the optimized schedule and the cost allocation.

In some embodiments, the method includes a process 1900 of transmitting 1920 an offer to the user based on the determined subscription recommendation. The offer may be mapped 1905 to the subscription. The content provider may be provided 1910 with one or more selectable options for changing one or more conditions of the subscription. The offer may be based 1915 on the one or more options for changing the one or more conditions selected by the content provider.

The method includes a process 2100 in which, in response to a determination 2140 that one or more changes of the subscription is likely to increase or decrease a predicted behavior occurring, offering 2145 a modified subscription based on the one or more changes. The predicted behavior is one or more of: a predicted likelihood of viewing the content item 2105, a predicted likelihood to purchase the subscription 2110, a predicted likelihood to renew the subscription 2115, and a predicted likelihood to cancel the subscription 2120. The one or more changes include one or more of: changing a price of the subscription 2125, changing a duration of the subscription 2130, and changing content accessible via the subscription 2135.

A system 300, 2200 is provided comprising control circuitry (e.g., 2208, 2234) configured to perform one, more, or all of the features, processes, and methods described above.

A non-transitory computer-readable medium having non-transitory computer-readable instructions encoded thereon is provided that, when executed by control circuitry (e.g., 2208, 2234), cause the control circuitry to perform one, more, or all of the features, processes, and methods described above.

A device (e.g., 101, 200, 305, 350, 360, 370, 2202, 2204) is provided including means for performing one, more, or all of the features described above.

Any of the features of the methods and systems above may be obtained with a trained model. The model may be trained with the catalog and/or the user map. The content index, the user index, and the subscription recommendation may be determined by a trained model.

Predictive Model

Throughout the present disclosure, determinations, predictions, likelihoods, user interest, relatedness, and the like may be determined with one or more predictive models. For example, FIG. 20 depicts a predictive model, which performs analysis based on one or more of hard rules, learning rules, hard models, learning models, usage data, load data, analytics of the same, metadata, profile information, and the like. A prediction process 2000 includes a predictive model 2050 in some embodiments. The predictive model 2050 receives as input various forms of data about one, more or all the users, media content items, devices, and data described in the present disclosure. The predictive model 2050 performs analysis based on one or more of hard rules, learning rules, hard models, learning models, usage data, load data, analytics of the same, metadata, profile information, and the like. The predictive model 2050 outputs one or more predictions of a future state of any of the devices described in the present disclosure. A load-increasing event may be determined by load-balancing techniques, e.g., least connection, least bandwidth, round robin, server response time, weighted versions of the same, resource-based techniques, and address hashing. The predictive model 2050 is based on input including one or more of a hard rule 2005, a user-defined rule 2010, a rule defined by a content provider 2015, a hard model 2020, and a learning model 2025.

The predictive model 2050 receives as input usage data 2030. The predictive model 2050 is based on one or more of a usage pattern of the user or media device, a usage pattern of the requesting media device, a usage pattern of the media content item, a usage pattern of the communication system or network, a usage pattern of the profile, and a usage pattern of the currently streaming media device.

The predictive model 2050 receives as input load-balancing data 2035. The predictive model 2050 is based on one or more of load data of the display device, load data of the requesting media device, load data of the media content item, load data of the communication system or network, load data of the profile, and load data of the currently streaming media device.

The predictive model 2050 receives as input metadata 2040. The predictive model 2050 is based on one or more of metadata of the streaming service, metadata of the requesting media device, metadata of the media content item, metadata of the communication system or network, metadata of the profile, and metadata of the currently streaming media device. The metadata may include information of the type represented in the media device manifest.

In some embodiments, the predictive model 2050 is trained with data. The training data is developed in some embodiments using one or more data techniques including but not limited to data selection, data sourcing, and data synthesis. The predictive model 2050 is trained in some embodiments with one or more analytical techniques including but not limited to classification and regression trees (CART), discrete choice models, linear regression models, logistic regression, logit versus probit, multinomial logistic regression, multivariate adaptive regression splines, probit regression, regression techniques, survival or duration analysis, and time series models. The predictive model 2050 is trained in some embodiments with one or more machine learning approaches including but not limited to supervised learning, unsupervised learning, semi-supervised learning, reinforcement learning, and dimensionality reduction. The predictive model 2050 in some embodiments includes regression analysis including analysis of variance (ANOVA), linear regression, logistic regression, ridge regression, and/or time series. The predictive model 2050 in some embodiments includes classification analysis including decision trees and/or neural networks. In FIG. 20, a depiction of a multi-layer neural network is provided as a non-limiting, exemplary predictive model 2050, the exemplary neural network including an input layer (left side), three hidden layers (middle), and an output layer (right side) with 32 neurons and 192 edges, which is intended to be illustrative, not limiting. In some embodiments, the predictive model 2050 is based on data engineering and/or modeling techniques. The data engineering techniques include exploration, cleaning, normalizing, feature engineering, and scaling. The modeling techniques include model selection, training, evaluation, and tuning. The predictive model 2050 is operationalized using registration, deployment, monitoring, and/or retraining techniques.

In some embodiments, the predictive model 2050 is configured to output a current state 2081, and/or a future state 2083, and/or a determination, a prediction, a likelihood, a level of user interestedness, a relatedness 2085, and the like.

In some embodiments, the predictive model 2050 is configured to output the current state 2081, and/or the future state 2083, and/or the determination, the prediction, the likelihood, the level of user interestedness, the relatedness 2085, and the like. The current state 2081, and/or the future state 2083, and/or the determination, the prediction, the likelihood, the level of user interestedness, the relatedness 2085, and the like, may concern one or more of, e.g., the system 300 of FIG. 3, the system 2200 of FIG. 22, the processes 400, 500, 700, 800, 900, 1000, 1100, 1300, 1400, 1500, 1600, 1700, 1800, 1900, 2000, 2100 of FIGS. 4, 5, 7, 8, 9, 10, 11, 13, 14, 15, 16, 17, 18, 19, 20, and 21, the GUI's of FIGS. 1A, 2, 6, and 12, and the like.

In some embodiments, the system 300, 2200 is configured to determine whether the current state 2081, and/or the future state 2083, and/or the determination, the prediction, the likelihood, the level of user interestedness, the relatedness 2085, and the like, satisfies a predetermined standard 2090. Based on whether the predetermined standard is satisfied 2090, a signal is outputted such as OK/Not OK, Go/No Go, Yes/No, and the like.

The system 300, 2200 and the predictive model 2050 may incorporate one or more of the features, systems, and methods disclosed in one or more of U.S. Pat. No. 8,732,737 to Kalmes et al., titled "GEOGRAPHIC CONTEXT WEIGHTED CONTENT RECOMMENDATION"; U.S. Pat. No. 8,881,209 to Kalmes et al., titled "FEEDBACK LOOP CONTENT RECOMMENDATION"; U.S. Pat. No. 9,774,911 to Thomas et al., titled "METHODS AND SYSTEMS FOR AUTOMATICALLY EVALUATING AN AUDIO DESCRIPTION TRACK OF A MEDIA ASSET"; U.S. Pat. No. 11,270,342 to Campbell et al., titled "SYSTEMS AND METHODS FOR DEDUCING USER INFORMATION FROM INPUT DEVICE BEHAVIOR"; and U.S. Patent Application Publication No. 2020/0074321 to Chungapalli et al., titled "METHODS AND SYSTEMS FOR USING MACHINE-LEARNING EXTRACTS AND SEMANTIC GRAPHS TO CREATE STRUCTURED DATA TO DRIVE SEARCH, RECOMMENDATION, AND DISCOVERY," each of which is incorporated by reference herein in its entirety.

Communication System

The system 300, 2200 for delivery of media content includes delivery of the media content from a content provider to a media device through a communication system or network 2206 (FIG. 22). The system 300, 2200 includes control circuitry 2234. The control circuitry 2234 is configured to perform one, more, or all the features of the methods referenced herein in any suitable combination.

A non-transitory, computer-readable medium having non-transitory, computer-readable instructions encoded thereon is provided. The non-transitory, computer-readable medium is provided for controlling delivery of media content from a content provider to a media device, through a communication system or network 2206. The instructions, when executed by control circuitry 2234, may cause the control circuitry 2234 to perform one, more, or all the features referenced herein of the methods, processes, and outputs of one or more of FIGS. 1-21 in any suitable combination.

A device is configured for controlling delivery of media content. The device includes means for performing one, more, or all the features referenced herein of the methods, processes, and outputs of one or more of FIGS. 1-21 in any suitable combination. The device is one of a server, a smartphone, a tablet, a network-connected computer, and any other type of user equipment, media device, and computing device.

FIG. 22 depicts a block diagram representing exemplary media content delivery control system 2200, in accordance with some embodiments. The system is shown to include computing device 2202, server 2204, and a communication network 2206. It is understood that while a single instance of a component may be shown and described relative to FIG. 22, additional instances of the component may be employed. For example, server 2204 may include, or may be incorporated in, more than one server. Similarly, communication network 2206 may include, or may be incorporated in, more than one communication network. Server 2204 is shown communicatively coupled to computing device 2202 through communication network 2206. While not shown in FIG. 22, server 2204 may be directly communicatively coupled to computing device 2202, for example, in a system absent or bypassing communication network 2206.

Communication network 2206 may include one or more network systems, such as, without limitation, the Internet, LAN, Wi-Fi, or other network systems suitable for audio processing applications. In some embodiments, the system of FIG. 22 excludes server 2204, and functionality that would otherwise be implemented by server 2204 is instead implemented by other components of the system depicted by FIG. 22, such as one or more components of communication network 2206. In still other embodiments, server 2204 works in conjunction with one or more components of communication network 2206 to implement certain functionality described herein in a distributed or cooperative manner. Similarly, in some embodiments, the system depicted by FIG. 22 excludes computing device 2202, and functionality that would otherwise be implemented by computing device 2202 is instead implemented by other components of the system depicted by FIG. 22, such as one or more components of communication network 2206 or server 2204 or a combination of the same. In other embodiments, computing device 2202 works in conjunction with one or more components of communication network 2206 or server 2204 to implement certain functionality described herein in a distributed or cooperative manner.

Computing device 2202 includes control circuitry 2208, display 2210 and input/output (I/O) circuitry 2212. Control circuitry 2208 may be based on any suitable processing circuitry and includes control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 2208 in turn includes communication circuitry 2226, storage 2222 and processing circuitry 2218. Either of control circuitry 2208 and 2234 may be utilized to execute or perform any or all the methods, processes, and outputs of one or more of FIGS. 1-21, or any combination of steps thereof (e.g., as enabled by processing circuitries 2218 and 2236, respectively).

In addition to control circuitry 2208 and 2234, computing device 2202 and server 2204 may each include storage (storage 2222, and storage 2238, respectively). Each of storages 2222 and 2238 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 8D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 2222 and 2238 may be used to store various types of content, metadata, and/or other types of data (e.g., they can be used to record audio questions asked by one or more participants connected to a conference). Non-volatile memory may also be used (e.g., to launch a boot-up routine and other instructions). Cloud-based storage may be used to supplement storages 2222 and 2238 or instead of storages 2222 and 2238. In some embodiments, a user profile and messages corresponding to a chain of communication may be stored in one or more of storages 2222 and 2238. Each of storages 2222 and 2238 may be utilized to stored commands on behalf of the QSA, for example, such that when each of processing circuitries 2218 and 2236, respectively, are prompted through control circuitries 2208 and 2234, respectively, either of processing circuitries 2218 or 2236 may execute any of the methods, processes, and outputs of one or more of FIGS. 1-21, or any combination of steps thereof.

In some embodiments, control circuitry 2208 and/or 2234 executes instructions for an application stored in memory (e.g., storage 2222 and/or storage 2238). Specifically, control circuitry 2208 and/or 2234 may be instructed by the application to perform the functions discussed herein. In some embodiments, any action performed by control circuitry 2208 and/or 2234 may be based on instructions received from the application. For example, the application may be implemented as software or a set of and/or one or more executable instructions that may be stored in storage 2222 and/or 2238 and executed by control circuitry 2208 and/or 2234. In some embodiments, the application may be a client/server application where only a client application resides on computing device 2202, and a server application resides on server 2204.

The application may be implemented using any suitable architecture. For example, it may be a stand-alone application wholly implemented on computing device 2202. In such an approach, instructions for the application are stored locally (e.g., in storage 2222), and data for use by the application is downloaded on a periodic basis (e.g., from an out-of-band feed, from an Internet resource, or using another suitable approach). Control circuitry 2208 may retrieve instructions for the application from storage 2222 and process the instructions to perform the functionality described herein. Based on the processed instructions, control circuitry 2208 may determine a type of action to perform in response to input received from I/O circuitry 2212 or from communication network 2206.

In client/server-based embodiments, control circuitry 2208 may include communication circuitry suitable for communicating with an application server (e.g., server 2204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 2206). In another example of a client/server-based application, control circuitry 2208 runs a web browser that interprets web pages provided by a remote server (e.g., server 2204). For example, the remote server may store the instructions for the application in a storage device.

The remote server may process the stored instructions using circuitry (e.g., control circuitry 2234) and/or generate displays. Computing device 2202 may receive the displays generated by the remote server and may display the content of the displays locally via display 2210. For example, display 2210 may be utilized to present a string of characters corresponding to FIGS. 1A, 1B, 2, 4, 6, 12, and the like. This way, the processing of the instructions is performed remotely (e.g., by server 2204) while the resulting displays, such as the display windows described elsewhere herein, are provided locally on computing device 2204. Computing device 2202 may receive inputs from the user via input/output circuitry 2212 and transmit those inputs to the remote server for processing and generating the corresponding displays.

Alternatively, computing device 2202 may receive inputs from the user via input/output circuitry 2212 and process and display the received inputs locally, by control circuitry 2208 and display 2210, respectively. For example, input/output circuitry 2212 may correspond to a keyboard and/or a set of and/or one or more speakers/microphones which are used to receive user inputs (e.g., input as displayed in a search bar or a display of FIG. 22 on a computing device). Input/output circuitry 2212 may also correspond to a communication link between display 2210 and control circuitry 2208 such that display 2210 updates in response to inputs received via input/output circuitry 2212 (e.g., simultaneously update what is shown in display 2210 based on inputs received by generating corresponding outputs based on instructions stored in memory via a non-transitory, computer-readable medium).

Server 2204 and computing device 2202 may transmit and receive content and data such as media content via communication network 2206. For example, server 2204 may be a media content provider, and computing device 2202 may be a smart television configured to download or stream media content, such as a live news broadcast, from server 2204. Control circuitry 2234, 2208 may send and receive commands, requests, and other suitable data through communication network 2206 using communication circuitry 2232, 2226, respectively. Alternatively, control circuitry 2234, 2208 may communicate directly with each other using communication circuitry 2232, 2226, respectively, avoiding communication network 2206.

It is understood that computing device 2202 is not limited to the embodiments and methods shown and described herein. In nonlimiting examples, computing device 2202 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same, capable of suitably displaying and manipulating media content.

Computing device 2202 receives user input 2214 at input/output circuitry 2212. For example, computing device 2202 may receive a user input such as a user swipe or user touch. It is understood that computing device 2202 is not limited to the embodiments and methods shown and described herein.

User input 2214 may be received from a user selection-capturing interface that is separate from device 2202, such as a remote-control device, trackpad, or any other suitable user movement-sensitive, audio-sensitive or capture devices, or as part of device 2202, such as a touchscreen of display 2210. Transmission of user input 2214 to computing device 2202 may be accomplished using a wired connection, such as an audio cable, USB cable, ethernet cable and the like attached to a corresponding input port at a local device, or may be accomplished using a wireless connection, such as Bluetooth, Wi-Fi, WiMAX, GSM, UTMS, CDMA, TDMA, 8G, 4G, 4G LTE, 5G, or any other suitable wireless transmission protocol. Input/output circuitry 2212 may include a physical input port such as a 12.5 mm (0.3346 inch) audio jack, RCA audio jack, USB port, ethernet port, or any other suitable connection for receiving audio over a wired connection or may include a wireless receiver configured to receive data via Bluetooth, Wi-Fi, WiMAX, GSM, UTMS, CDMA, TDMA, 3G, 4G, 4G LTE, 5G, or other wireless transmission protocols.

Processing circuitry 2218 may receive user input 2214 from input/output circuitry 2212 using communication path 2216. Processing circuitry 2218 may convert or translate the received user input 2214 that may be in the form of audio data, visual data, gestures, or movement to digital signals. In some embodiments, input/output circuitry 2212 performs the translation to digital signals. In some embodiments, processing circuitry 2218 (or processing circuitry 2236, as the case may be) carries out disclosed processes and methods.

Processing circuitry 2218 may provide requests to storage 2222 by communication path 2220. Storage 2222 may provide requested information to processing circuitry 2218 by communication path 2246. Storage 2222 may transfer a request for information to communication circuitry 2226 which may translate or encode the request for information to a format receivable by communication network 2206 before transferring the request for information by communication path 2228. Communication network 2206 may forward the translated or encoded request for information to communication circuitry 2232, by communication path 2230.

At communication circuitry 2232, the translated or encoded request for information, received through communication path 2230, is translated or decoded for processing circuitry 2236, which will provide a response to the request for information based on information available through control circuitry 2234 or storage 2238, or a combination thereof. The response to the request for information is then provided back to communication network 2206 by communication path 2240 in an encoded or translated format such that communication network 2206 can forward the encoded or translated response back to communication circuitry 2226 by communication path 2242.

At communication circuitry 2226, the encoded or translated response to the request for information may be provided directly back to processing circuitry 2218 by communication path 2254 or may be provided to storage 2222 through communication path 2244, which then provides the information to processing circuitry 2218 by communication path 2246. Processing circuitry 2218 may also provide a request for information directly to communication circuitry 2226 through communication path 2252, where storage 2222 responds to an information request (provided through communication path 2220 or 2244) by communication path 2224 or 2246 that storage 2222 does not contain information pertaining to the request from processing circuitry 2218.

Processing circuitry 2218 may process the response to the request received through communication paths 2246 or 2254 and may provide instructions to display 2210 for a notification to be provided to the users through communication path 2248. Display 2210 may incorporate a timer for providing the notification or may rely on inputs through input/output circuitry 2212 from the user, which are forwarded through processing circuitry 2218 through communication path 2248, to determine how long or in what format to provide the notification. When display 2210 determines the display has been completed, a notification may be provided to processing circuitry 2218 through communication path 2250.

The communication paths provided in FIG. 22 between computing device 2202, server 2204, communication network 2206, and all subcomponents depicted are exemplary and may be modified to reduce processing time or enhance processing capabilities for each step in the processes disclosed herein by one skilled in the art.

This specification discloses embodiments, which include, but are not limited to the following:

1. A method comprising:
   accessing a user profile and/or a subscription profile;
   determining an interest in a content item based on the one or more of user profile, the subscription profile, and a content item profile;
   in response to the determined interest satisfying a condition, determining whether access to the content item is included in the subscription profile; and
   in response to determining that access to the content item is not included in the subscription profile, modifying the subscription profile to include access to the content item.

2. The method of item 1, further comprising:
   in response to determining that access to the content item is not included in the subscription profile, generating a recommendation and a user selectable option for accepting the recommendation.

3. The method of item 1, further comprising:
   determining that the subscription profile includes access to a channel including a series of content items;
   determining that an entirety of the series was viewed; and wherein the modifying the subscription profile to include access to the content item includes automatically modifying the subscription profile to delete access to the channel including the viewed series while automatically modifying the subscription profile to include the access to the content item.

4. The method of item 1, further comprising generating for a service provider one or more selectable options for modifying one or more of the user profile, the subscription profile, and the content item profile.

5. The method of item 1, further comprising generating for a central service one or more selectable options for modifying one or more of the user profile, the subscription profile, and the content item profile.

6. The method of item 1, further comprising generating for a user a selectable option to grant or deny access to the subscription profile via an application programming interface (API).

7. The method of item 1, further comprising receiving account subscription data from a service provider.

8. The method of item 1, further comprising determining one or more of:
previously viewed content items,
a frequency of viewing the one or more previously viewed content items,
whether a new episode of a new content item is viewed in one or more of a live viewing state, an on-demand viewing state, in a recorded state, and in a binge pattern state.

9. The method of item 1, further comprising predicting an impact on a viewing experience of one or more users in response to the modifying the subscription profile to include access to the content item.

10. The method of item 1, further comprising:
storing an identification of a first pause point of a media asset associated with a first user interaction profile;
storing an identification of a second pause point of the media asset associated with a second user interaction profile;
receiving a request to access the media asset during a current consumption session;
identifying user interface inputs received during the current consumption session;
selecting one of the first pause point and the second pause point as a selected pause point based on determining whether the identified user interface inputs match user interface inputs associated with the first user interaction profile or the second user interaction profile; and
generating for presentation the media asset starting from the selected pause point.

11. The method of item 1, further comprising:
determining that a plurality of user profiles is associated with an account of a media application;
generating for presentation a media asset during a first consumption session associated with the account;
generating for presentation a selectable option to associate a current progress point of the media asset with one or more of the plurality of user profiles associated with the account;
receiving a selection of one or more of the plurality of user profiles via the selectable option;
during a second consumption session, receiving a request for accessing the media asset; and
in response to determining that the second consumption session is associated with the selected one or more user profiles, resuming the media asset from the progress point associated with the selectable option.

12. The method of item 1, further comprising determining, for each user profile of a plurality of user profiles, one or more of a scrolling rate, selection of one or more trick play functions, a watching pattern, selection of a command to skip a commercial, and a preference for a type of content.

13. The method of item 1, further comprising determining in the subscription profile an eligibility for a channel to be exchanged for another channel.

14. The method of item 1, further comprising determining whether one or more content items are available now and/or will be available over a given time period.

15. The method of item 1, further comprising generating metadata about upcoming shows and/or content from advertisements.

16. The method of item 1, further comprising automatically scheduling of a recording on a timeshift channel.

17. The method of item 1, further comprising generating an offering profile for one or more content items, the offering profile including a data structure associated with the one or more content items.

18. The method of item 18, wherein the data structure includes information indicating whether the one or more content items are scheduled to be re-aired, a frequency of the one or more content items scheduled to be re-aired, whether the one or more content items are available on-demand, and a duration in time for the one or more content items to be available on-demand.

19. The method of item 1, further comprising generating a notification for display on an electronic programming guide (EPG) including one or more new channels added to the subscription profile.

20. The method of item 1, further comprising generating one or more selectable options to modify the subscription profile based on a recommendation determined in response to the determined interest satisfying a condition.

21. The method of item 20, further comprising generating for display a comparison table summarizing a viewing activity and one or more content items that are accessible in response to acceptance of the recommendation.

22. The method of item 1, further comprising prioritizing one or more content items based on one or more of content availability, the determined interest in the one or more content items, a determination of a rate of consumption of previously viewed one or more content items, and a determination of whether one or more content items will re-air.

23. The method of item 1, further comprising determining whether the access is available free or available for a fee.

24. The method of item 1, further comprising:
accessing a catalog of one or more content items, the catalog comprising:
for each of one or more content providers, and for each content item, a content index based on one or more content attributes of the content item;
accessing a user map of one or more users, the map comprising:
for each of one or more time periods, and for each user, a user index based on a determined user interest in the one or more of the content attributes; and
determining a subscription recommendation for each user based on one or more of the catalog, the content index, the user map, and the user index.

25. The method of item 24,
wherein the one or more content attributes include: a title, a genre, a microgenre, an actor, an age, an expiration date, an n-th language, an (n+1)-th language, a running time, a time slot, a date of production, a rating, a user-defined content attribute, and a customized content attribute, and wherein the content index includes a weight for each of the one or more of the content attributes.

26. The method of item 24, wherein the determined user interest includes a determined past user interest in the one or more of the content attributes, a determined current user interest in the one or more of the content attributes, and a determined predicted future user interest in the one or more of the content attributes, and wherein the user index includes a weight for each of the one or more of the content attributes.

27. The method of item 24, wherein the determined user interest is based on a determination by one or more of a machine learning technique, a predictive model, a model training technique, data selection, data sourcing, data synthesis, an analytical technique, a regression analysis, a classification analysis, a neural network, data engineering, data modeling, operationalization using registration, a deployment, monitoring, and a retraining technique.

28. The method of item 24, wherein the catalog is mapped to the user map using the content index of each content item and the user index of each user.

29. The method of item 24, wherein the determining of the subscription recommendation for each user includes one or more of:
a subscription recommendation for a past subscriber,
a subscription recommendation for a current subscriber, and
a subscription recommendation for a potential subscriber, and wherein the determining of the subscription recommendation for each user is further based on one or more of:
past information based on formerly available content from the one or more content providers,
current information based on currently available content from the one or more content providers, and
future information based on upcoming content from the one or more content providers.

30. The method of item 24, further comprising:
analyzing one or more of:
one or more media devices accessing a streaming service,
a user profile of the user linked to the one or more media devices connected to the streaming service, and
the content item or content items sent to and/or received from the one or more media devices;
controlling the subscription based on the analyzing; and
controlling the one or more content items based on the analyzing.

31. The method of item 24, further comprising:
determining an optimized schedule for the subscription recommendation;
determining a cost allocation for the optimized schedule; and
generating a user interface for controlling the subscription based on the optimized schedule and the cost allocation.

32. The method of item 24, further comprising:
transmitting an offer to the user based on the determined subscription recommendation,
wherein the offer is mapped to the subscription,
wherein the content provider is provided with one or more selectable options for changing one or more conditions of the subscription, and wherein the offer is based on the one or more options for changing the one or more conditions selected by the content provider.

33. The method of item 24, further comprising:
in response to a determination that one or more changes of the subscription is likely to increase or decrease a predicted behavior occurring, offering a modified subscription based on the one or more changes,
wherein the predicted behavior is one or more of:
a predicted likelihood of viewing the content item,
a predicted likelihood to purchase the subscription,
a predicted likelihood to renew the subscription, and
a predicted likelihood to cancel the subscription, and
wherein the one or more changes include one or more of:
changing a price of the subscription,
changing a duration of the subscription, and
changing content accessible via the subscription.

34. A system comprising control circuitry configured to: perform one or more functions of items 1-33.

35. A non-transitory computer-readable medium having non-transitory computer-readable instructions encoded thereon that, when executed by control circuitry, cause the control circuitry to perform one or more functions of items 1-33.

36. A device comprising means to perform one or more functions of items 1-33.

Definitions

The terminology used herein is for the purpose of describing embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes all combinations of one or more of the associated listed items.

Although at least one exemplary embodiment is described as using a plurality of units to perform the exemplary process, it is understood that the exemplary processes may also be performed by one or a plurality of modules. Additionally, it is understood that the term controller/control unit may refer to a hardware device that includes a memory and a processor. The memory may be configured to store the modules, and the processor may be specifically configured to execute said modules to perform one or more processes, which are described further below.

The use of the terms "first," "second," "third," and so on, herein, are provided to identify structures or operations, without describing an order of structures or operations, and, to the extent the structures or operations are used in an exemplary embodiment, the structures may be provided, or the operations may be executed in a different order from the stated order unless a specific order is definitely specified in the context.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory, computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random access memory (RAM), etc.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

The systems and processes discussed herein are intended to be illustrative and not limiting. One skilled in the art would appreciate that the actions of the processes discussed herein may be omitted, modified, combined, and/or rearranged, and any additional actions may be performed. More generally, the disclosure herein is meant to be exemplary and not limiting. Only the claims that follow are meant to set bounds as to what the present disclosure includes. Furthermore, it should be noted that the features and limitations described in any one exemplary embodiment may be applied to any other exemplary embodiment herein, and flowcharts or examples relating to one exemplary embodiment may be combined with any other exemplary embodiment in a suitable manner, done in different orders, or done in parallel. In addition, the methods and systems described herein may be performed in real time. It should also be noted that the systems and/or methods described herein may be applied to, or used in accordance with, other systems and/or methods.

Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   accessing a user profile and/or a subscription profile;
   determining an interest in a content item based on at least one of the user profile, the subscription profile, or a content item profile;
   based at least in part on the determined interest satisfying a condition, determining whether access to the content item is included in the subscription profile; and
   based at least in part on determining that access to the content item is not included in the subscription profile:
   causing display of one or more selectable options to modify the subscription profile based on a recommendation determined based at least in part on the determined interest satisfying the condition; and
   causing display of a comparison table summarizing a viewing activity associated with the user profile and one or more content items that will be accessible with the modified subscription profile.

2. The method of claim 1,
   wherein at least one of the one or more selectable options to modify the subscription profile based on the recommendation is for accepting the recommendation.

3. The method of claim 1, further comprising predicting an impact on a viewing experience of one or more users based at least in part on the modifying the subscription profile to include access to the content item.

4. The method of claim 1, further comprising dynamically causing display of an offering profile for one or more content items, the offering profile including a data structure associated with the one or more content items, wherein the dynamically caused display of offering profile is developed during broadcast of the one or more content items.

5. The method of claim 4, wherein the data structure includes information indicating whether the one or more content items are scheduled to be re-aired, a frequency of the one or more content items scheduled to be re-aired, whether the one or more content items are available on-demand, and a duration in time for the one or more content items to be available on-demand.

6. The method of claim 1, further comprising:
   accessing a catalog of a second one or more content items, the catalog comprising:
      for each of one or more content providers, and for the each content item of the second one or more content items, a content index based on one or more content attributes of the content item;
   accessing a user map of one or more users, the user map comprising:
      for each of one or more time periods, and for each user of a plurality of users, a user index based on a determined user interest in the one or more content attributes; and
   determining a subscription recommendation for the each user of the plurality of users based on one or more of the catalog, the content index, the user map, and the user index.

7. The method of claim 6,
   wherein the one or more content attributes include: a title, a genre, a microgenre, an actor, an age, an expiration date, an n-th language, an (n+1)-th language, a running time, a time slot, a date of production, a rating, a user-defined content attribute, and a customized content attribute, and
   wherein the content index includes a weight for each of the one or more content attributes.

8. The method of claim 6, wherein the catalog is mapped to the user map using the content index of each content item and the user index of each user.

9. The method of claim 1, wherein the one or more content items are included in the comparison table based at least in part on determining that the viewing activity associated with the user profile indicates that the one or more content items have not been viewed by a user of the user profile.

10. The method of claim 1, wherein at least one content item is included in the viewing activity of the comparison table, and each of the at least one content item and the one or more content items is included in the comparison table based at least in part on determining that the at least one content item is related to the one or more content items.

11. The method of claim 1, further comprising, based at least in part on the determined interest satisfying the condition and based at least in part on determining that access to the content item is not included in the subscription profile:
   determining whether an automatic mode is active for the user profile and/or the subscription profile;
   based at least in part on determining that the automatic mode is active, automatically modifying the subscription profile to include access to the content item; and
   causing display of, at the user profile, a notification associated with the modified subscription profile.

12. A system comprising control circuitry configured to:
   access a user profile and/or a subscription profile;
   determine an interest in a content item based on at least one of the user profile, the subscription profile, or a content item profile;

based at least in part on the determined interest satisfying a condition, determine whether access to the content item is included in the subscription profile; and based at least in part on determining that access to the content item is not included in the subscription profile:

cause display of one or more selectable options to modify the subscription profile based on a recommendation determined based at least in part on the determined interest satisfying the condition; and cause display of a comparison table summarizing a viewing activity associated with the user profile and one or more content items that will be accessible with the modified subscription profile.

13. The system of claim 12, wherein at least one of the one or more selectable options to modify the subscription profile based on the recommendation is for accepting the recommendation.

14. The system of claim 12, the control circuitry further configured to predict an impact on a viewing experience of one or more users based at least in part on the modifying the subscription profile to include access to the content item.

15. The system of claim 12, the control circuitry further configured to dynamically cause display of an offering profile for one or more content items, the offering profile including a data structure associated with the one or more content items, wherein the dynamically caused display of the offering profile is developed during broadcast of the one or more content items.

16. The system of claim 15, wherein the data structure includes information indicating whether the one or more content items are scheduled to be re-aired, a frequency of the one or more content items scheduled to be re-aired, whether the one or more content items are available on-demand, and a duration in time for the one or more content items to be available on-demand.

17. The system of claim 12, the control circuitry further configured to:

access a catalog of a second one or more content items, the catalog comprising:

for each of one or more content providers, and for the each content item of the second one or more content items, a content index based on one or more content attributes of the content item;

access a user map of one or more users, the user map comprising:

for each of one or more time periods, and for each user of a plurality of users, a user index based on a determined user interest in the one or more content attributes; and determine a subscription recommendation for the each user of the plurality of users based on one or more of the catalog, the content index, the user map, and the user index.

18. The system of claim 17, wherein the one or more content attributes include: a title, a genre, a microgenre, an actor, an age, an expiration date, an n-th language, an (n+1)-th language, a running time, a time slot, a date of production, a rating, a user-defined content attribute, and a customized content attribute, and wherein the content index includes a weight for each of the one or more content attributes.

19. The system of claim 12, wherein the control circuitry is configured to include the one or more content items in the comparison table based at least in part on determining that the viewing activity associated with the user profile indicates that the one or more content items have not been viewed by a user of the user profile.

20. A method comprising:

accessing a user profile and/or a subscription profile;

determining an interest in a content item based on at least one of the user profile, the subscription profile, or a content item profile;

based at least in part on the determined interest satisfying a condition, determining whether access to the content item is included in the subscription profile; and based at least in part on the determining that access to the content item is not included in the subscription profile, dynamically causing display of an offering profile for one or more content items, the offering profile including a data structure associated with the one or more content items and information indicating whether the one or more content items are scheduled to be re-aired, wherein the dynamically generated offering profile is developed during broadcast of the one or more content items.

* * * * *

UNITED STATES PATENT AND TRADEMARK OFFICE
CERTIFICATE OF CORRECTION

PATENT NO. : 12,184,934 B2
APPLICATION NO. : 17/741148
DATED : December 31, 2024
INVENTOR(S) : Daina Emmanuel et al.

It is certified that error appears in the above-identified patent and that said Letters Patent is hereby corrected as shown below:

Page 1 of 1

In the Claims

Claim 6, Column 36, Line 14, delete "the".

Claim 6, Column 36, Line 24, delete "the".

Claim 17, Column 37, Line 40, delete "the".

Claim 17, Column 38, Line 7, delete "the".

Signed and Sealed this
Fourth Day of February, 2025

Coke Morgan Stewart
*Acting Director of the United States Patent and Trademark Office*